United States Patent [19]
Okada et al.

[11] Patent Number: 5,963,377
[45] Date of Patent: Oct. 5, 1999

[54] TAKING OPTICAL SYSTEM FOR VIDEO SHOOTING

[75] Inventors: Takashi Okada, Nishinomiya; Tetsuo Kohno, Toyonaka; Hideki Nagata, Sakai, all of Japan

[73] Assignee: Minolta Co., Ltd., Osaka, Japan

[21] Appl. No.: 09/165,275

[22] Filed: Oct. 1, 1998

[30] Foreign Application Priority Data

Oct. 2, 1997  [JP]  Japan ................................. 9-269670
Oct. 2, 1997  [JP]  Japan ................................. 9-269673

[51] Int. Cl.$^6$ ........................... G02B 15/16; G02B 13/18
[52] U.S. Cl. ..................... 359/686; 359/663; 359/676; 359/683; 359/708
[58] Field of Search .................... 359/663, 676, 359/683, 684, 686, 687, 688, 709, 740

[56] References Cited

U.S. PATENT DOCUMENTS

| | | | |
|---|---|---|---|
| 4,477,148 | 10/1984 | Tsuji et al. | 350/286 |
| 5,009,491 | 4/1991 | Hata | 350/427 |
| 5,682,203 | 10/1997 | Kato | 348/340 |
| 5,805,350 | 9/1998 | Yamamoto | 359/686 |
| 5,872,660 | 2/1999 | Kohno et al. | 359/689 |

FOREIGN PATENT DOCUMENTS 6-331891  12/1994  Japan .

*Primary Examiner*—Georgia Epps
*Assistant Examiner*—David N. Spector
*Attorney, Agent, or Firm*—Sidley & Austin

[57] ABSTRACT

A zoom lens system is provided with, from the object side, a first lens unit having a negative optical power, a second lens unit having a positive optical power, a third lens unit having a negative optical power, and a condenser lens unit having a positive optical power. In this zoom lens system, zooming is performed by varying the distances between the first, the second, the third lens unit, and the condenser lens unit. Additionally, this zoom lens system fulfills the condition below:

$$-1.5 < \phi 1/\phi C < -0.4$$

where $\phi 1$ represents the optical power of the first lens unit, and $\phi C$ represents the optical power of the condenser lens unit.

19 Claims, 18 Drawing Sheets

FNO=4.12
—— d
----- SC
-0.5  0.5
SPHERICAL SINE
ABERRATION CONDITION

Y'=3.1
----- DM
—— DS
-0.5  0.5
ASTIGMATISM

Y'=3.1
-5.0  5.0
DISTORTION %

FNO=6.10
—— d
----- SC
-0.5  0.5
SPHERICAL SINE
ABERRATION CONDITION

Y'=3.1
----- DM
—— DS
-0.5  0.5
ASTIGMATISM

Y'=3.1
-5.0  5.0
DISTORTION %

FNO=8.24
—— d
----- SC
-0.5  0.5
SPHERICAL SINE
ABERRATION CONDITION

Y'=3.1
----- DM
—— DS
-0.5  0.5
ASTIGMATISM

Y'=3.1
-5.0  5.0
DISTORTION %

FNO=3.62

—— d
---- SC

-0.5  0.5
SPHERICAL SINE
ABERRATION CONDITION

Y'=3.1

---- DM
—— DS

-0.5  0.5
ASTIGMATISM

Y'=3.1

-5.0  5.0
DISTORTION %

FNO=4.68

—— d
---- SC

-0.5  0.5
SPHERICAL SINE
ABERRATION CONDITION

Y'=3.1

---- DM
—— DS

-0.5  0.5
ASTIGMATISM

Y'=3.1

-5.0  5.0
DISTORTION %

FNO=5.86

—— d
---- SC

-0.5  0.5
SPHERICAL SINE
ABERRATION CONDITION

Y'=3.1

---- DM
—— DS

-0.5  0.5
ASTIGMATISM

Y'=3.1

-5.0  5.0
DISTORTION %

FIG. 8A
FNO=3.61
FIG. 8B
Y'=3.1
FIG. 8C
Y'=3.1
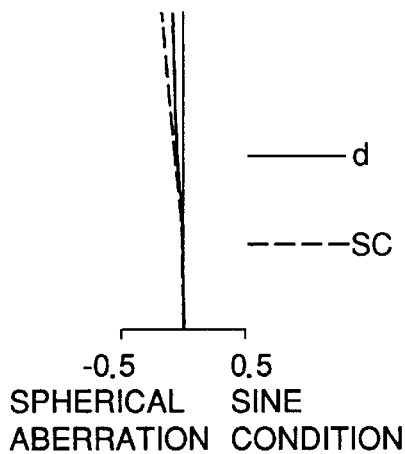
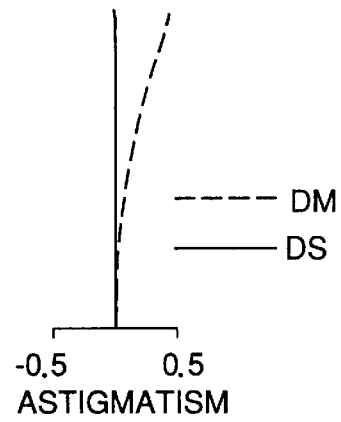
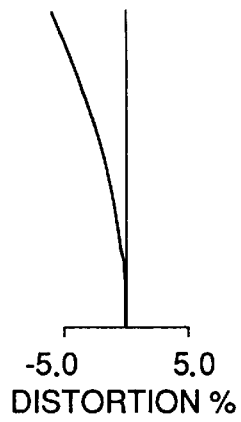
FIG. 8D
FNO=4.95
FIG. 8E
Y'=3.1
FIG. 8F
Y'=3.1
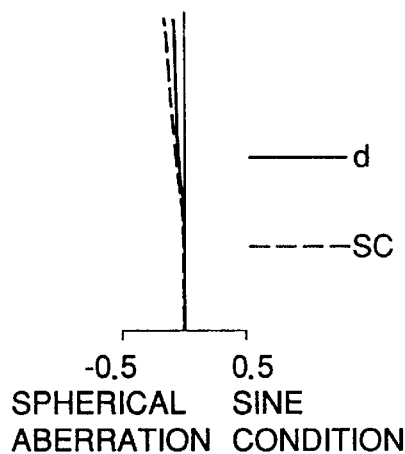
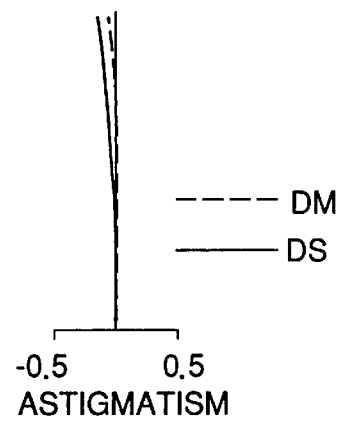
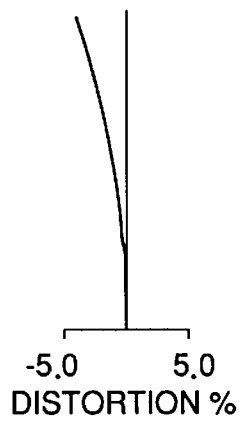
FIG. 8G
FNO=6.97
FIG. 8H
Y'=3.1
FIG. 8I
Y'=3.1
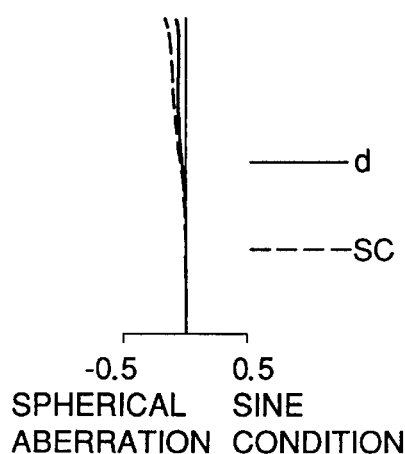
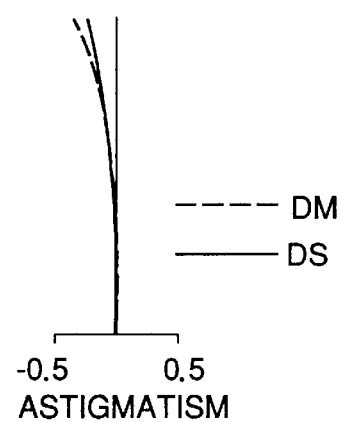
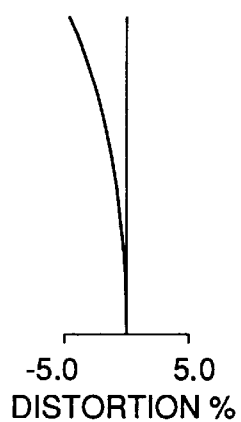

FNO=4.12

—— d
---- SC

-0.5   0.5
SPHERICAL SINE
ABERRATION CONDITION

Y'=3.0

---- DM
—— DS

-0.5   0.5
ASTIGMATISM

Y'=3.0

-5.0   5.0
DISTORTION %

FNO=6.10

—— d
---- SC

-0.5   0.5
SPHERICAL SINE
ABERRATION CONDITION

Y'=3.0

---- DM
—— DS

-0.5   0.5
ASTIGMATISM

Y'=3.0

-5.0   5.0
DISTORTION %

FNO=8.24

—— d
---- SC

-0.5   0.5
SPHERICAL SINE
ABERRATION CONDITION

Y'=3.0

---- DM
—— DS

-0.5   0.5
ASTIGMATISM

Y'=3.0

-5.0   5.0
DISTORTION %

FNO=3.62
— d
---- SC
-0.5  0.5
SPHERICAL SINE
ABERRATION CONDITION

Y'=3.0
---- DM
— DS
-0.5  0.5
ASTIGMATISM

Y'=3.0
-5.0  5.0
DISTORTION %

FNO=4.68
— d
---- SC
-0.5  0.5
SPHERICAL SINE
ABERRATION CONDITION

Y'=3.0
---- DM
— DS
-0.5  0.5
ASTIGMATISM

Y'=3.0
-5.0  5.0
DISTORTION %

FNO=5.84
— d
---- SC
-0.5  0.5
SPHERICAL SINE
ABERRATION CONDITION

Y'=3.0
---- DM
— DS
-0.5  0.5
ASTIGMATISM

Y'=3.0
-5.0  5.0
DISTORTION %

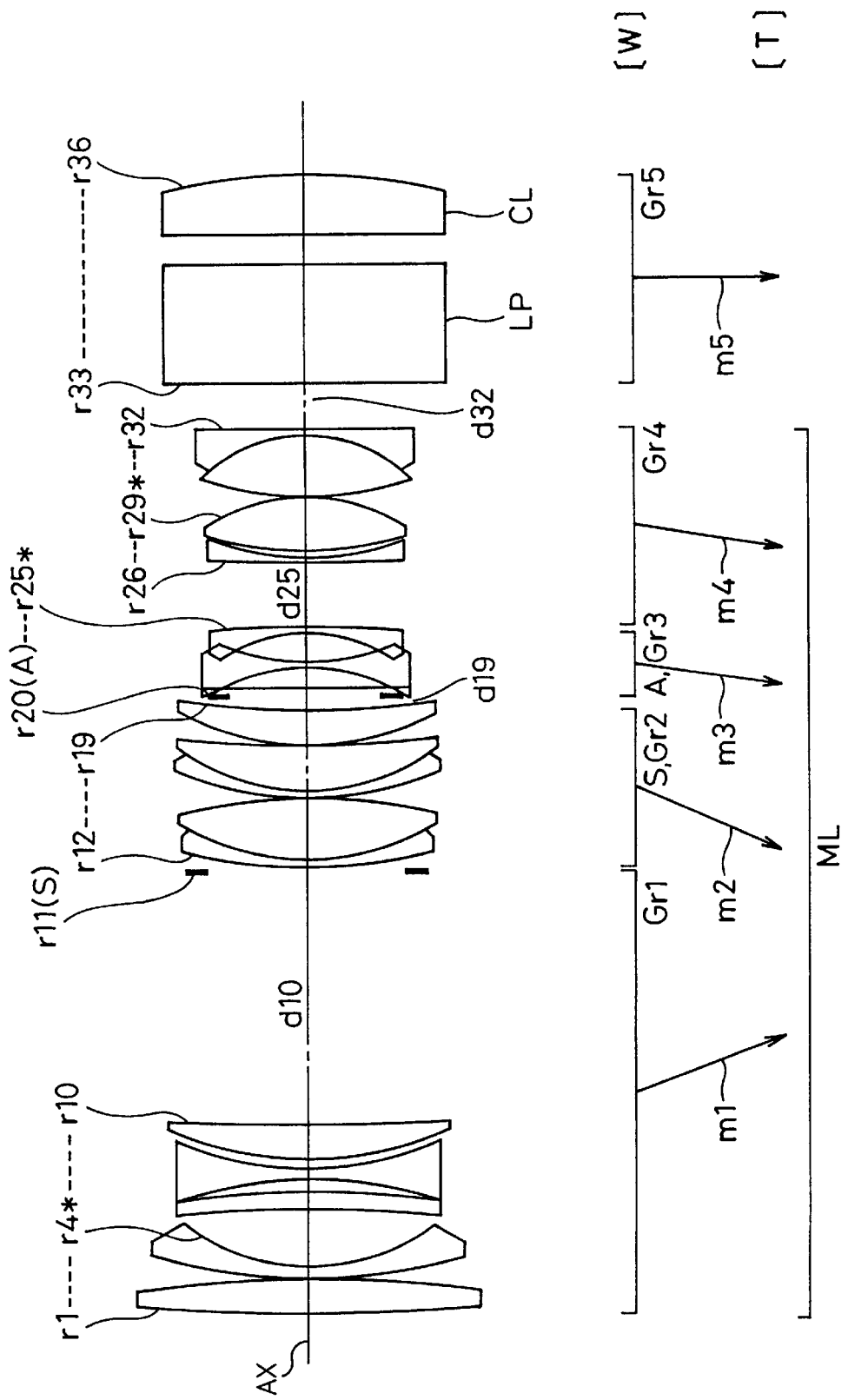

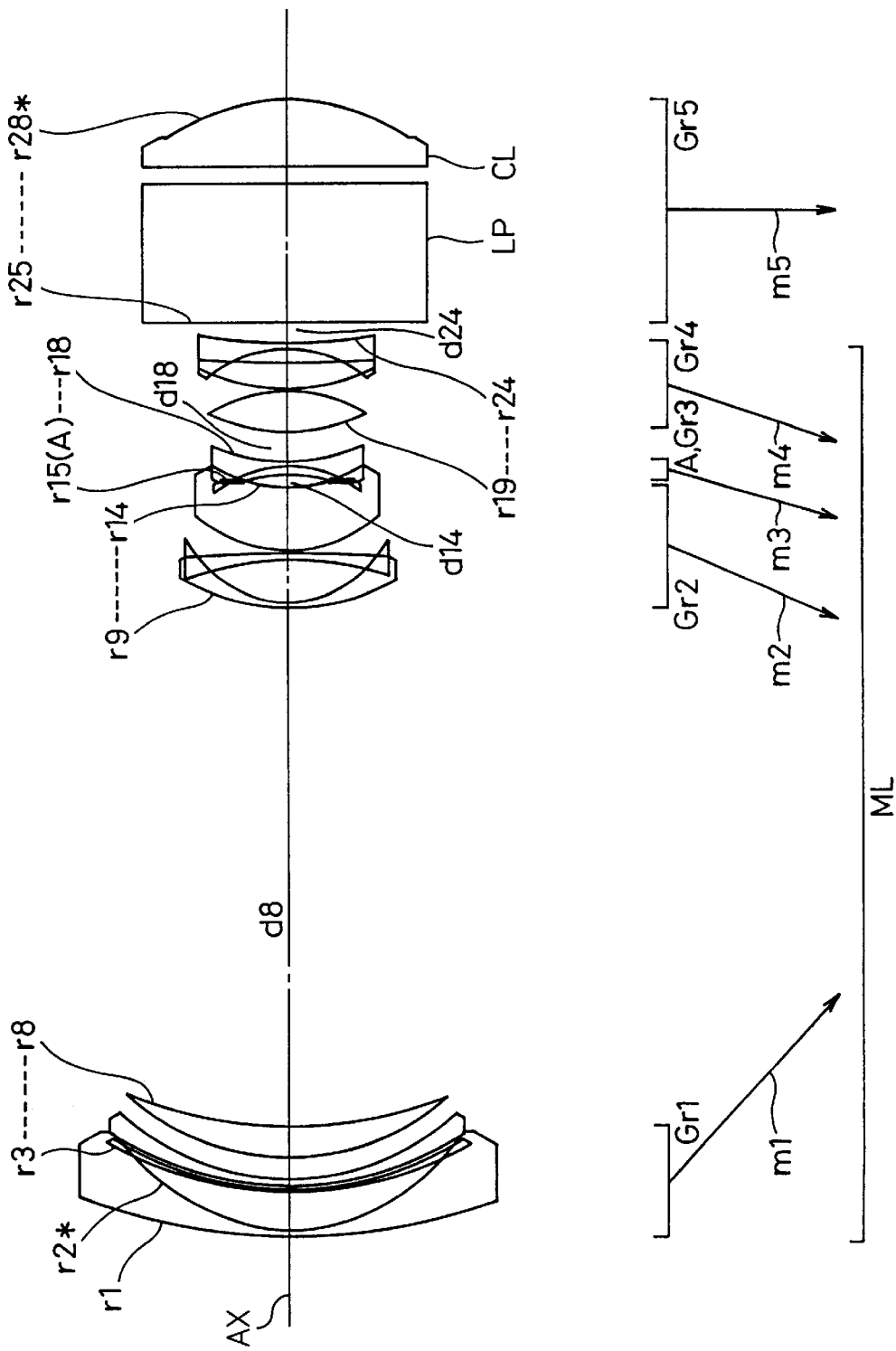

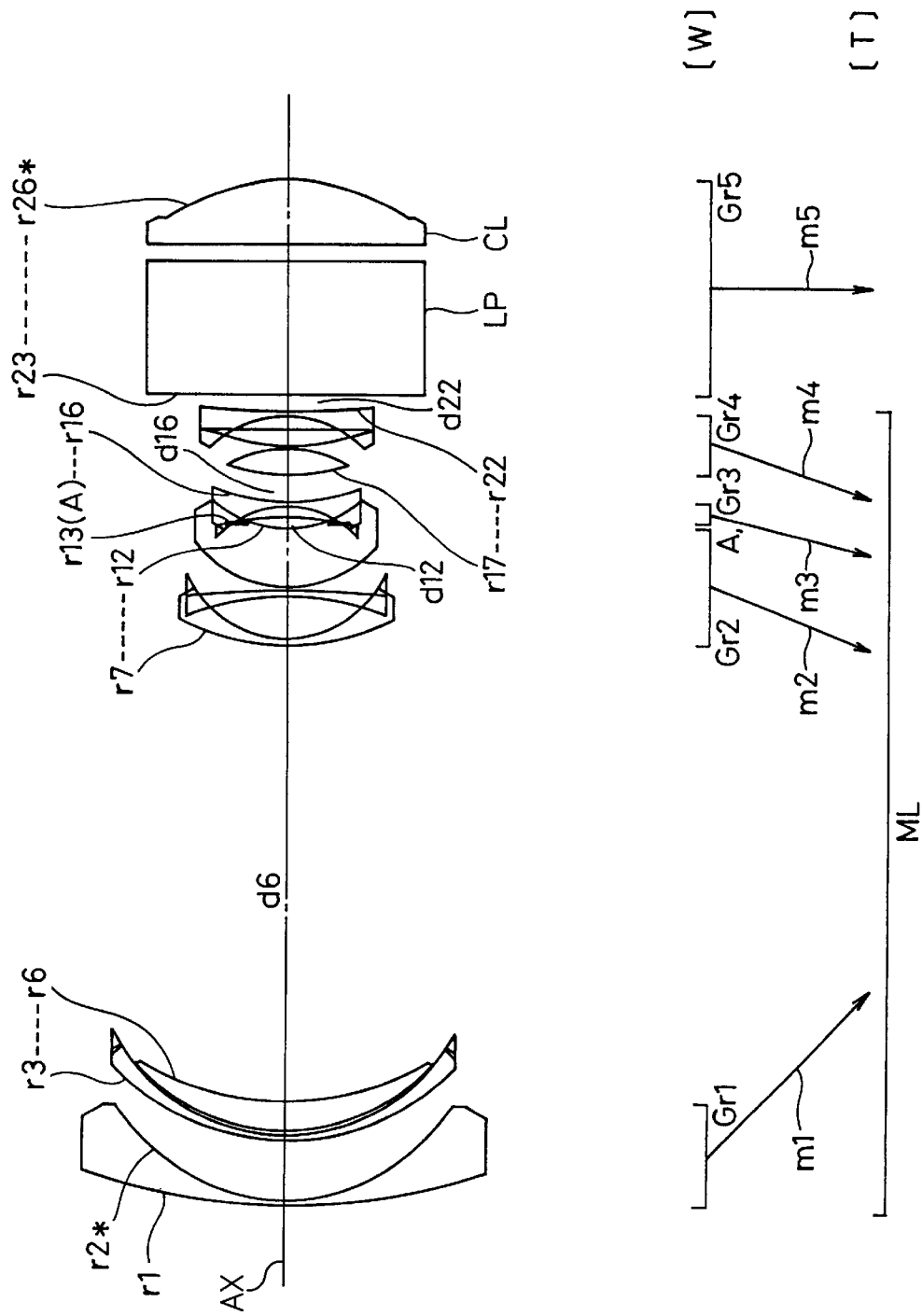

FNO=2.87

— d
----SC

-0.2   0.2
SPHERICAL  SINE
ABERRATION  CONDITION

Y'=3.0

---- DM
—— DS

-0.2   0.2
ASTIGMATISM

Y'=3.0

-5.0   5.0
DISTORTION %

FNO=2.87

— d
----SC

-0.2   0.2
SPHERICAL  SINE
ABERRATION  CONDITION

Y'=3.0

---- DM
—— DS

-0.2   0.2
ASTIGMATISM

Y'=3.0

-5.0   5.0
DISTORTION %

FNO=2.87

— d
----SC

-0.2   0.2
SPHERICAL  SINE
ABERRATION  CONDITION

Y'=3.0

---- DM
—— DS

-0.2   0.2
ASTIGMATISM

Y'=3.0

-5.0   5.0
DISTORTION %

FNO=2.83

—— d
---- SC

-0.2   0.2
SPHERICAL  SINE
ABERRATION CONDITION

Y'=3.0

---- DM
—— DS

-0.2   0.2
ASTIGMATISM

Y'=3.0

-5.0   5.0
DISTORTION %

FNO=2.83

—— d
---- SC

-0.2   0.2
SPHERICAL  SINE
ABERRATION CONDITION

Y'=3.0

---- DM
—— DS

-0.2   0.2
ASTIGMATISM

Y'=3.0

-5.0   5.0
DISTORTION %

FNO=2.83

—— d
---- SC

-0.2   0.2
SPHERICAL  SINE
ABERRATION CONDITION

Y'=3.0

---- DM
—— DS

-0.2   0.2
ASTIGMATISM

Y'=3.0

-5.0   5.0
DISTORTION %

FNO=3.60
—— d
---- SC
-0.2  0.2
SPHERICAL SINE
ABERRATION CONDITION

Y'=3.0
---- DM
—— DS
-0.2  0.2
ASTIGMATISM

Y'=3.0
-5.0  5.0
DISTORTION %

FNO=3.96
—— d
---- SC
-0.2  0.2
SPHERICAL SINE
ABERRATION CONDITION

Y'=3.0
---- DM
—— DS
-0.2  0.2
ASTIGMATISM

Y'=3.0
-5.0  5.0
DISTORTION %

FNO=4.60
—— d
---- SC
-0.2  0.2
SPHERICAL SINE
ABERRATION CONDITION

Y'=3.0
---- DM
—— DS
-0.2  0.2
ASTIGMATISM

Y'=3.0
-5.0  5.0
DISTORTION %

FIG. 18A
FNO=3.60
FIG. 18B
Y'=3.0
FIG. 18C
Y'=3.0
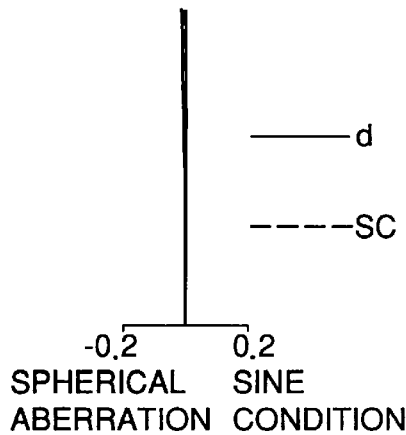
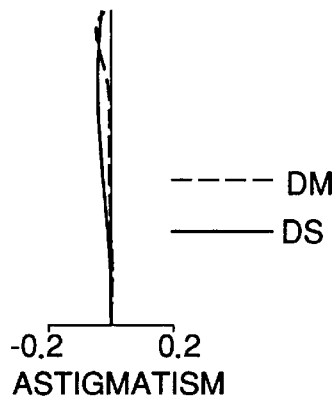
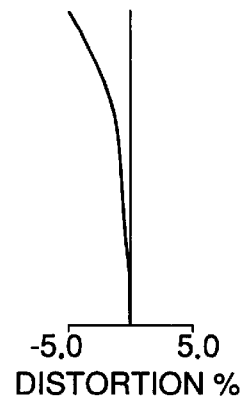
—— d
---- SC
---- DM
—— DS
-0.2  0.2
SPHERICAL SINE
ABERRATION CONDITION
-0.2  0.2
ASTIGMATISM
-5.0  5.0
DISTORTION %
FIG. 18D
FNO=3.96
FIG. 18E
Y'=3.0
FIG. 18F
Y'=3.0
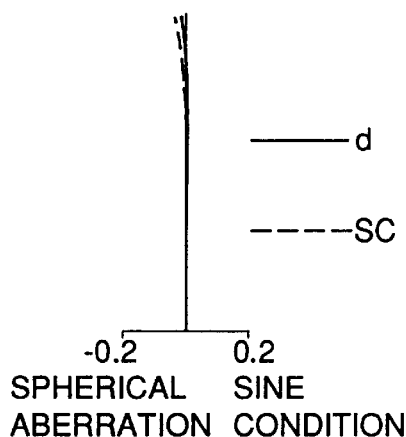
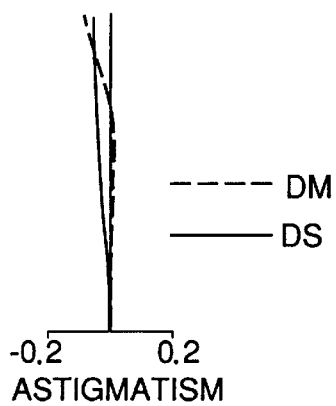
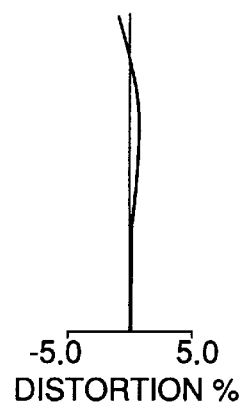
—— d
---- SC
---- DM
—— DS
-0.2  0.2
SPHERICAL SINE
ABERRATION CONDITION
-0.2  0.2
ASTIGMATISM
-5.0  5.0
DISTORTION %
FIG. 18G
FNO=4.60
FIG. 18H
Y'=3.0
FIG. 18I
Y'=3.0
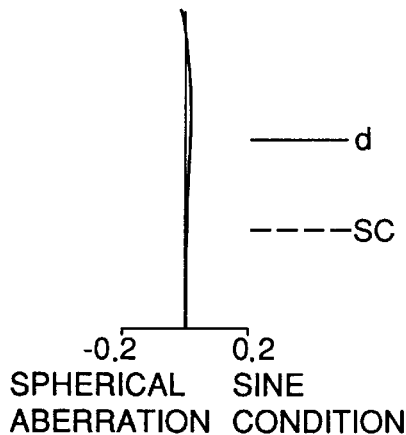
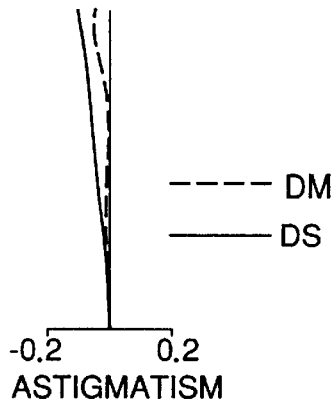
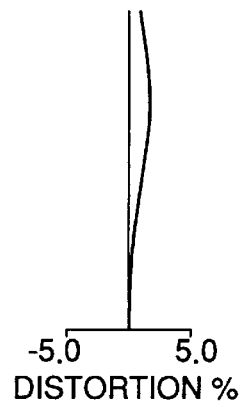
—— d
---- SC
---- DM
—— DS
-0.2  0.2
SPHERICAL SINE
ABERRATION CONDITION
-0.2  0.2
ASTIGMATISM
-5.0  5.0
DISTORTION %

TAKING OPTICAL SYSTEM FOR VIDEO SHOOTING

This application is based on applications Nos. H09-269670 and H09-269673 filed in Japan, the content of which is hereby incorporated by reference.

BACKGROUND OF THE INVENTION

1. Field of the Invention

The present invention relates to a taking optical system for video shooting, and more particularly to a compact taking optical system for video shooting suitable for use in cameras provided with a solid-state imaging device.

2. Description of the Prior Art

In cameras (for example, video cameras or television cameras) that shoot an object by receiving a light beam incoming through a taking optical system by means of a solid-state imaging device (for example, a CCD (charge coupled device)) composed of an array of a plurality of light-receiving elements, a condensing microlens is provided on the incident-surface side of each light-receiving element so as to enhance its light-receiving efficiency. To increase the light-condensing ability of such condensing microlenses, conventional taking optical systems are so designed that the exit pupil is placed substantially at infinity (i.e. so designed as to be substantially telecentric toward the image side). In this structure, off-axial light beams enter the microlens from a direction approximately perpendicular to the incident surface of the light-receiving elements. This helps increase the light-condensing ability of the microlenses.

In recent years, to achieve more compact cameras, taking optical systems having short total lengths have been in demand. However, if a taking optical system is made shorter in total length, it is inevitable that its exit pupil comes closer to the image plane. This causes the microlenses disposed at the periphery of the image to receive off-axial light beams from oblique directions with respect to the incident surfaces of the light-receiving elements. As a result, the light-condensing ability of the microlenses is degraded at the periphery of the image, and thus the image shot by the solid-state imaging device suffers from uneven brightness between the central and peripheral portions thereof. As described above, in conventional taking optical systems, it is not possible to place the exit pupil substantially at infinity and simultaneously reduce the total length.

SUMMARY OF THE INVENTION

An object of the present invention is to provide a taking optical system for video shooting that has a relatively short total length and nevertheless has its exit pupil placed substantially at infinity.

To achieve the above object, according to one aspect of the present invention, a zoom lens system is provided with, from the object side, a first lens unit having a negative optical power, a second lens unit having a positive optical power, a third lens unit having a negative optical power, and a condenser lens unit having a positive optical power. In this zoom lens system, zooming is performed by varying the distances between the first, the second, the third lens unit, and the condenser lens unit. Additionally, this zoom lens system fulfills the condition below:

$$-1.5 < \phi 1/\phi C < -0.4$$

where $\phi 1$ represents the optical power of the first lens unit; and
$\phi C$ represents the optical power of the condenser lens unit.

BRIEF DESCRIPTION OF THE DRAWINGS

This and other objects and features of this invention will become clear from the following description, taken in conjunction with the preferred embodiments with reference to the accompanied drawings in which:

FIGS. 8A to 8I are graphic representations of the aberrations observed in the taking optical system of Example 3;

FIG. 11 is a lens arrangement diagram of the taking optical system of a sixth embodiment (Example 6) of the present invention;

FIG. 13 is a lens arrangement diagram of the taking optical system of an eighth embodiment (Example 8) of the present invention;

FIG. 14 is a lens arrangement diagram of the taking optical system of a ninth embodiment (Example 9) of the present invention;

FIGS. 18A to 18I are graphic representations of the aberrations observed in the taking optical system of Example 9.

DESCRIPTION OF THE PREFERRED EMBODIMENTS

Hereinafter, taking optical systems embodying the present invention will be described with reference to the accompanying drawings.

Embodiments 1 to 5

Figure 1:
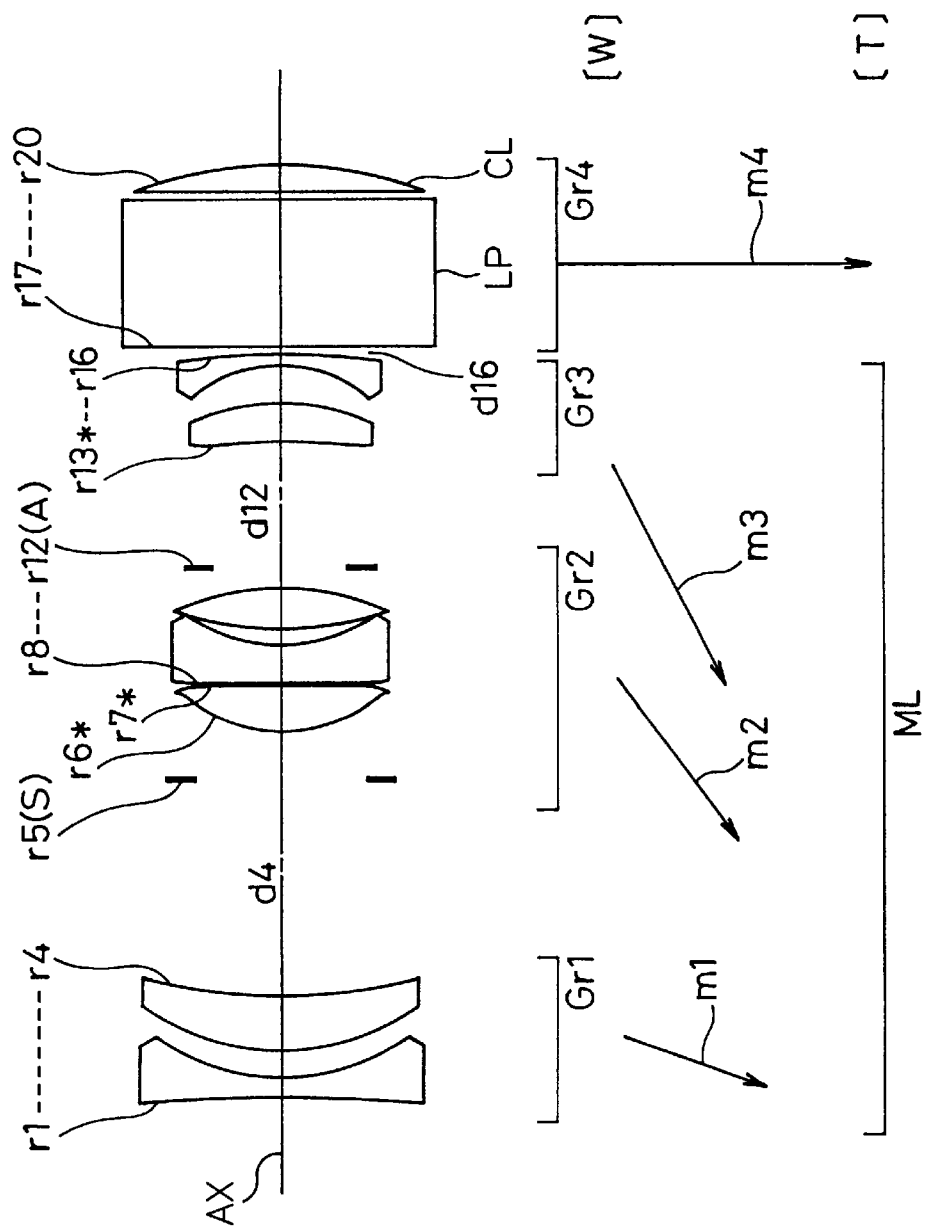
FIG. 1 is a lens arrangement diagram of the taking optical system of a first embodiment (Example 1) of the present invention.
Figure 2:
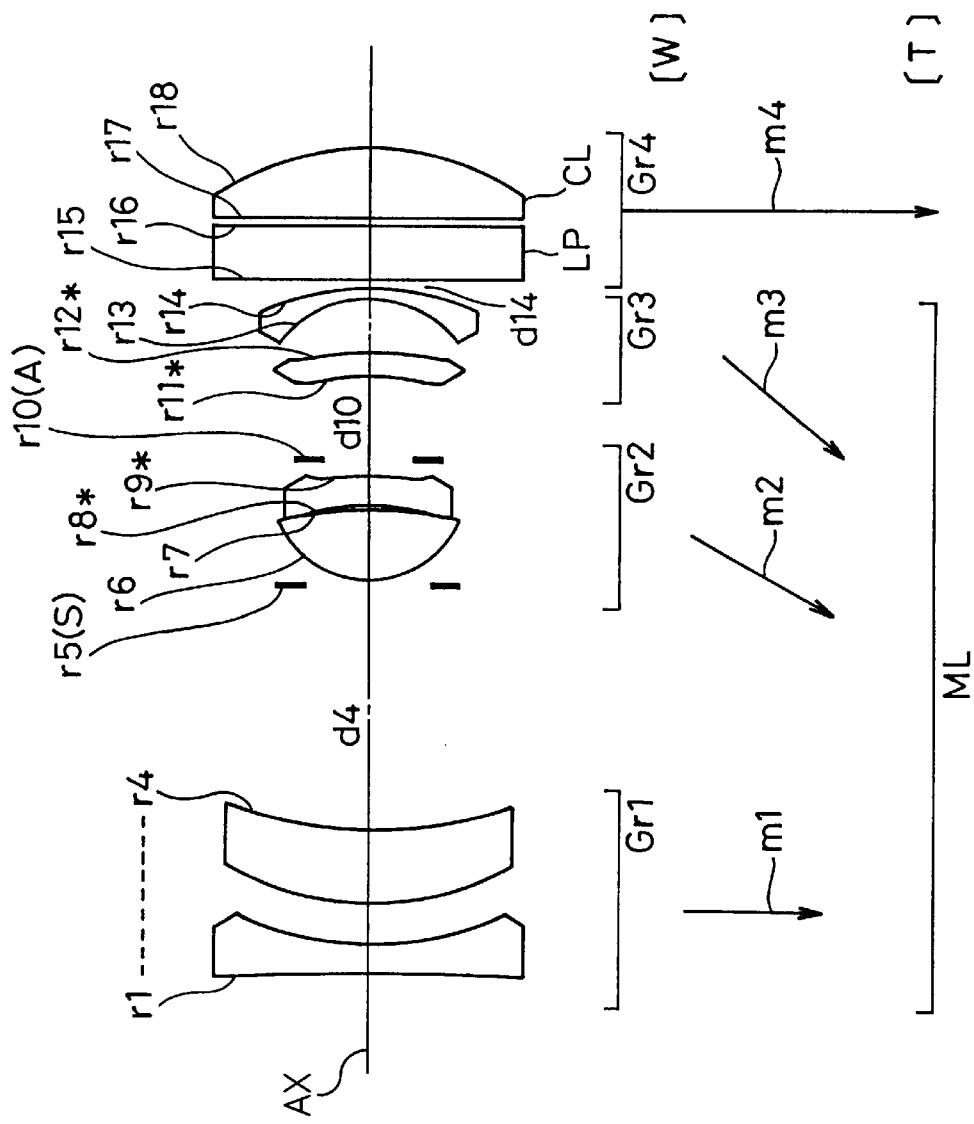
FIG. 2 is a lens arrangement diagram of the taking optical system of a second embodiment (Example 2) of the present invention.
Figure 3:
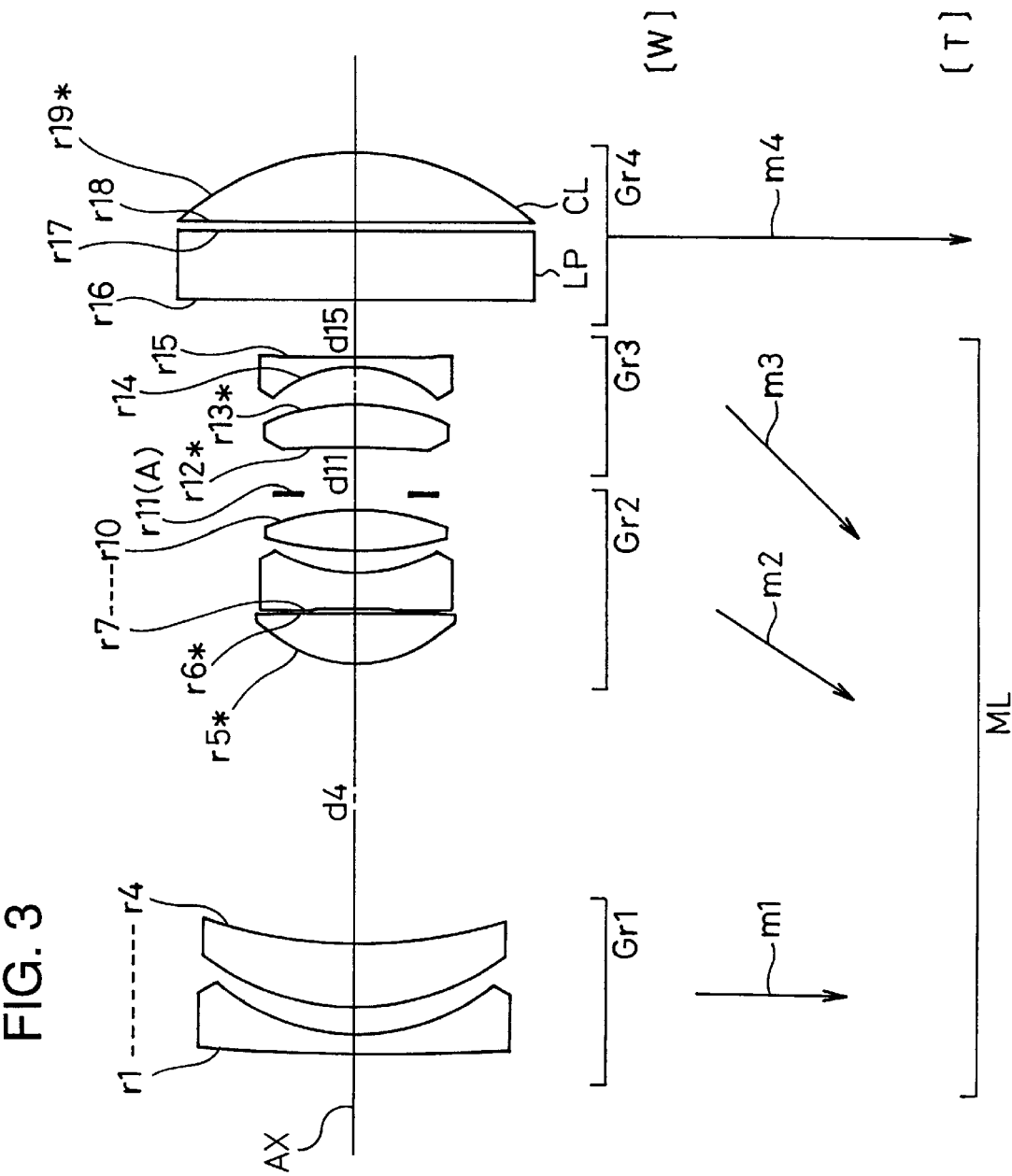
FIG. 3 is a lens arrangement diagram of the taking optical system of a third embodiment (Example 3) of the present invention.
Figure 4:
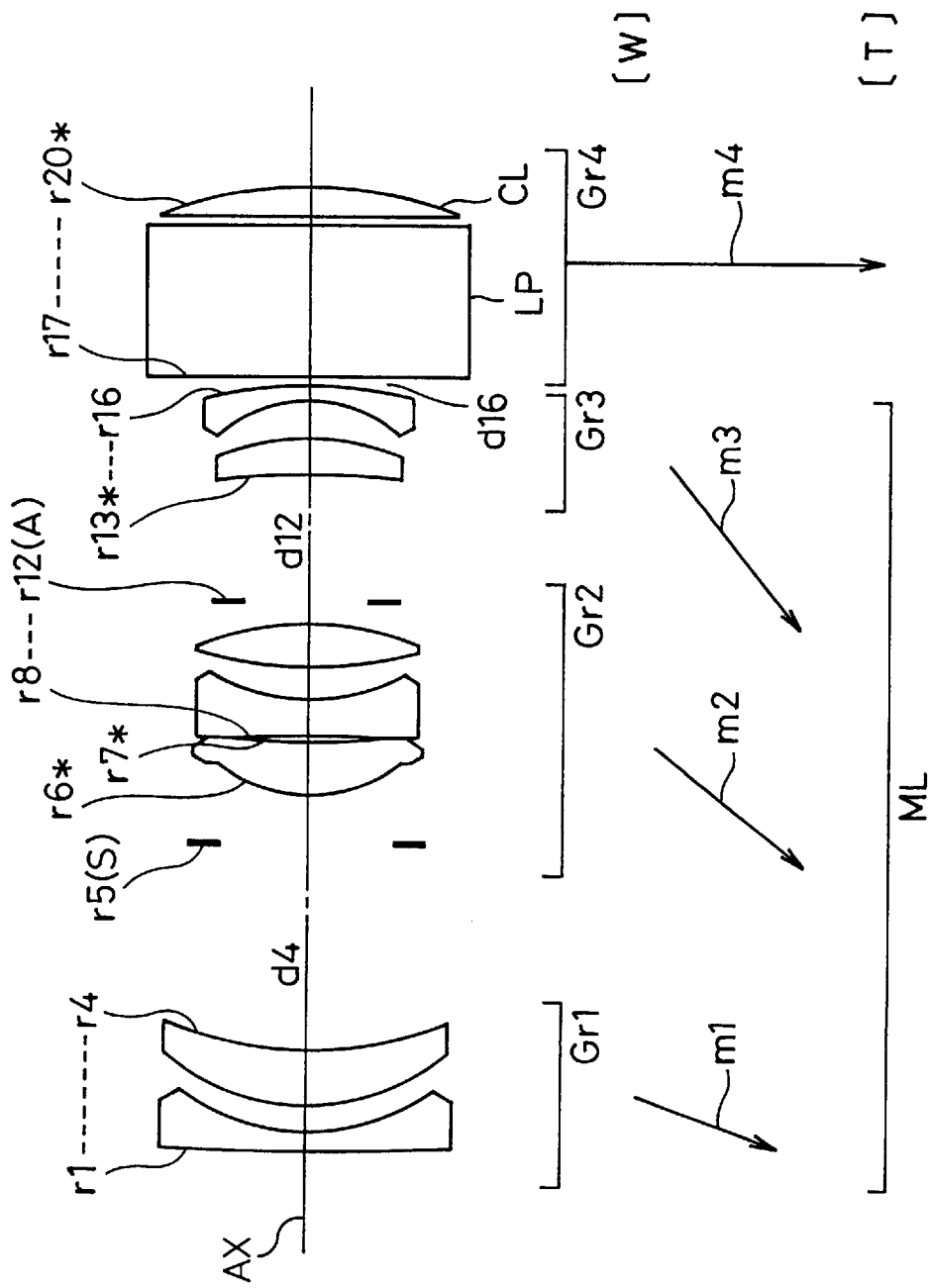
FIG. 4 is a lens arrangement diagram of the taking optical system of a fourth embodiment (Example 4) of the present invention.
Figure 5:
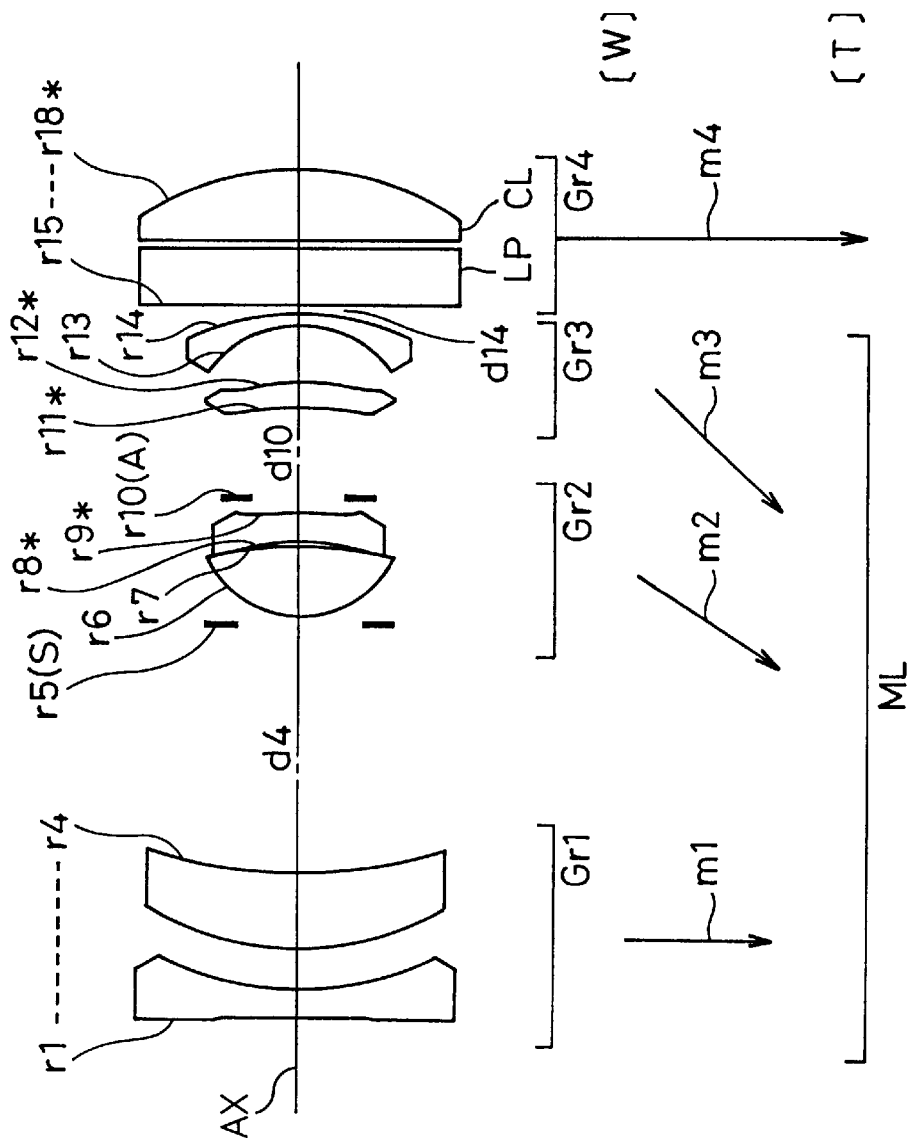
FIG. 5 is a lens arrangement diagram of the taking optical system of a fifth embodiment (Example 5) of the present invention.

FIGS. 1 to 5 show the lens arrangement of the taking optical systems of a first to a fifth embodiment, respectively, of the present invention, as observed at the wide-angle end [W]. In each lens arrangement diagram, arrow mi (i=1, 2, 3, . . . ) schematically indicates the movement of the ith lens unit (Gri) during zooming from the wide-angle end (the shortest-focal-length condition) [W] to the telephoto end (the longest-focal length condition) [T]. Moreover, in each lens arrangement diagram, a surface marked with ri (i=1, 2, 3, . . . ) is the ith surface counted from the object side, and a surface ri marked with an asterisk (*) is an aspherical surface. Furthermore, an axial distance marked with di (i=1, 2, 3, . . . ) is the ith axial distance counted from the object side, though only those axial distances between the lens units that vary with zooming are shown here.

The taking optical systems for video shooting of the first to fifth embodiments are all used to form an object image on a solid-state imaging device (not shown) and are each provided with, from the object side, a main optical system ML having a positive optical power, a low-pass filter LP, and a condenser lens unit CL having a positive optical power. The main optical system ML is composed of three zoom units that are, from the object side, a first lens unit Gr1 having a negative optical power, a second lens unit Gr2 having a positive optical power, and a third lens unit Gr3 having a negative optical power. The low-pass filter LP and the condenser lens unit CL constitute a fourth lens unit Gr4 having a positive optical power.

The main optical system ML, on the one hand, acts as a three-unit zoom lens system (of a negative-positive-negative configuration) having its own optical characteristics, and, on the other hand, acts as the principal portion of a four-unit zoom lens system (of a negative-positive-negative-positive configuration) that constitutes a taking optical system as a whole and that includes, as its last lens unit (i.e. the fourth lens unit Gr4), a low-pass filter LP and a condenser lens unit CL that are kept in fixed positions during zooming. The condenser lens unit CL is placed between the main optical system ML and the solid-state imaging device and in the vicinity of the image plane. The condenser lens unit CL acts, by its positive optical power, to place the exit pupil of the taking optical system substantially at infinity.

Zooming is performed by varying the distances between the lens units. It should be noted that, since the fourth lens unit Gr4 is a fixed lens unit, the distance between the third lens unit Gr3 and the condenser lens unit CL also varies. In the first, second, fourth, and fifth embodiments, between the surface disposed at the object-side end of the second lens unit Gr2 and the surface disposed at the image-side end of the first lens unit Gr1, a shielding plate (flare cutter) S is placed that moves together with the second lens unit Gr2 during zooming. Moreover, in the first to fifth embodiments, between the surface disposed at the image-side end of the second lens unit Gr2 and the surface disposed at the object-side end of the third lens unit Gr3, an aperture stop A is placed that moves together with the second lens unit Gr2 during zooming.

In the taking optical system of the first embodiment, the lens units constituting the main optical system ML are each composed, from the object side, as follows. The first lens unit Gr1 is composed of a negative biconcave lens element and a positive meniscus lens element convex to the object side. The second lens unit Gr2 is composed of a positive biconvex lens element, a negative meniscus lens element concave to the image side, and a positive biconvex lens element. The third lens unit Gr3 is composed of a positive meniscus lens element convex to the image side and a negative meniscus lens element concave to the object side. The condenser lens unit CL is composed of a plano-convex lens element convex to the image side.

In the taking optical system of the second embodiment, the lens units constituting the main optical system ML are each composed, from the object side, as follows. The first lens unit Gr1 is composed of a negative biconcave lens element and a positive meniscus lens element convex to the object side. The second lens unit Gr2 is composed of a positive biconvex lens element and a negative meniscus lens element con cave to the object side. The third lens unit Gr3 is composed of two negative meniscus lens elements concave to the object side. The condenser lens unit CL is composed of a plano-convex lens element convex to the image side.

In the taking optical system of the third embodiment, the lens units constituting the main optical system ML are each composed, from the object side, as follows. The first lens unit Gr1 is composed of a negative meniscus lens element concave to the image side and a positive meniscus lens element convex to the object side. The second lens unit Gr2 is composed of a positive biconvex lens element, a negative biconcave lens element, and a positive biconvex lens element. The third lens unit Gr3 is composed of a positive meniscus lens element convex to the image side and a negative biconcave lens element. The condenser lens unit CL is composed of a plano-convex lens element convex to the image side.

In the taking optical system of the fourth embodiment, the lens units constituting the main optical system ML are each composed, from the object side, as follows. The first lens unit Gr1 is composed of a negative meniscus lens element concave to the image side and a positive meniscus lens element convex to the object side. The second lens unit Gr2 is composed of a positive meniscus lens element convex to the object side, a negative biconcave lens element, and a positive biconvex lens element. The third lens unit Gr3 is composed of a positive meniscus lens element convex to the image side and a negative meniscus lens element concave to the object side. The condenser lens unit CL is composed of a plano-convex lens element convex to the image side.

In the taking optical system of the fifth embodiment, the lens units constituting the main optical system ML are each composed, from the object side, as follows. The first lens unit Gr1 is composed of a negative biconcave lens element and a positive meniscus lens element convex to the object side. The second lens unit Gr2 is composed of a positive biconvex lens element and a negative meniscus lens element concave to the object side. The third lens unit Gr3 is composed of two negative meniscus lens elements concave to the object side. The condenser lens unit CL is composed of a plano-convex lens element convex to the image side.

As described previously, in a camera that is provided with a solid-state imaging device, it is preferable that light beams be shone perpendicularly onto the incident surface of the solid-state imaging device, and accordingly it is preferable that the exit pupil of the taking optical system be placed as far away from the image plane as possible. As described above, in all of the aforementioned embodiments, the condenser lens unit CL, which is disposed between the main optical system ML and the solid-state imaging device and in the vicinity of the image plane, acts, by its positive optical power, to place the exit pupil of the taking optical system substantially at infinity. By this action of the condenser lens unit CL, it is possible to place the exit pupil of the taking optical system as far away from the image plane as possible and thereby shorten the total length of the taking optical system. Moreover, in these embodiments, the exit pupil of the taking optical system can be placed away from the image plane with substantially no degradation in the image-formation performance of the main optical system ML, in striking contrast to a taking optical system having no condenser lens unit CL.

In a three-unit zoom lens system of a negative-positive-negative configuration, the position of the exit pupil of the taking optical system depends principally on the optical power of the first lens unit Gr1. Thus, the optical power of the condenser lens unit CL is determined in accordance with the position of the exit pupil of the main optical system ML. For example, the stronger the optical power of the condenser lens unit CL, the stronger its action to place the exit pupil of the taking optical system away from the image plane. Thus, the closer the exit pupil of the main optical system ML is to the image plane, the stronger the optical power of the condenser lens unit CL needs to be. In contrast, the weaker the optical power of the condenser lens unit CL, the weaker its action to place the exit pupil of the taking optical system closer to the image plane. Thus, the farther the exit pupil of the main optical system ML is away from the image plane, the weaker the optical power of the condenser lens unit CL needs to be.

Moreover, since the main optical system ML itself acts as a zoom lens system, the exit pupil moves along the optical axis AX during zooming. Accordingly, it is preferable to strike a proper balance between the position of the exit pupil at the wide-angle end [W] and that at the telephoto end [T]. If this balance is neglected, the exit pupil is placed in an inappropriate position with respect to the solid-state imaging device at one of the wide-angle and telephoto ends. To strike a proper balance, it is preferable that at least one of Conditions (1) to (3) below be fulfilled that define the relation between the position of the exit pupil of the main optical system ML and the optical power of the condenser lens unit CL.

In a four-unit zoom lens system, like those of the first to fifth embodiments, that consists of, from the object side, a three-unit main optical system ML and a condenser lens unit CL, wherein the main optical system ML consists of a negative, a positive, and a negative lens unit, it is preferable that Condition (1) below be fulfilled.

$$-1.5 < \phi 1/\phi C < -0.4 \qquad (1)$$

where $\phi 1$ represents the optical power of the first lens unit (Gr1); and $\phi C$ represents the optical power of the condenser lens unit (CL).

If the lower limit of Condition (1) is exceeded, the negative optical power of the first lens unit Gr1 is too strong, and thus the back focal length is so long that, even though the exit pupil of the main optical system ML is placed away from the image plane, the heights at which the incoming light beams enter the lens units other than the first lens unit are unduly great. As a result, it is difficult to correct the aberrations, in particular excessively large positive distortion and spherical aberration, that occur in the main optical system ML. In contrast, if the upper limit of Condition (1) is exceeded, the negative optical power of the first lens unit Gr1 is too weak, and thus the exit pupil is placed so close to the image plane that the condenser lens unit CL needs to have a stronger optical power. Increasing the power of the condenser lens unit CL causes aberrations therein; in particular excessively large positive distortion and a large Petzval sum cause unduly large astigmatic difference.

In a four-unit zoom lens system, like those of the first to fifth embodiments, that consists of, from the object side, a three-unit main optical system ML and a condenser lens unit CL, wherein the main optical system ML consists of a negative, a positive, and a negative lens unit, it is preferable that Condition (2) below be fulfilled.

$$1.4 < \phi 2/\phi C < 2.5 \qquad (2)$$

where $\phi 2$ represents the optical power of the second lens unit (Gr2); and $\phi C$ represents the optical power of the condenser lens unit (CL).

If the upper limit of Condition (2) is exceeded, the positive optical power of the second lens unit Gr2 is too strong, and thus the back focal length is so short that the exit pupil is placed too close to the image plane. Accordingly, the condenser lens unit CL needs to be given a stronger optical power. However, an excessive increase in the optical power of the condenser lens unit CL causes aberrations therein; in particular excessively large positive distortion and a large Petzval sum cause unduly large astigmatic difference. This makes it difficult to correct aberrations properly. In contrast, if the lower limit of Condition (2) is exceeded, the positive optical power of the second lens unit Gr2 is too weak, and thus the back focal length is so long that the exit pupil of the main optical system ML is placed away from the image plane. This, although convenient to a solid-state imaging device such as a CCD, makes the entire taking optical system unduly large, and thus spoils its compactness.

In a four-unit zoom lens system, like those of the first to fifth embodiments, that consists of, from the object side, a three-unit main optical system ML and a condenser lens unit CL, wherein the main optical system ML consists of a negative, a positive, and a negative lens unit, it is preferable that Condition (3) below be fulfilled.

$$2.0 < \phi 3/\phi C < -0.7 \qquad (3)$$

where $\phi 3$ represents the optical power of the third lens unit (Gr3); and $\phi C$ represents the optical power of the condenser lens unit (CL).

If the lower limit of Condition (3) is exceeded, the negative optical power of the third lens unit Gr3 is too strong. This makes the entire taking optical system telephoto-oriented and compact, but simultaneously makes the back focal length so short that the exit pupil is placed too close to the image plane. Accordingly, the condenser lens unit CL needs to be given a stronger optical power. However, an excessive increase in the optical power of the condenser lens unit CL causes aberrations therein; in particular, excessively large positive distortion and a large Petzval sum cause unduly large astigmatic difference. This makes it difficult to correct aberrations properly. In contrast, if the upper limit of Condition (3) is exceeded, the negative optical power of the third lens unit Gr3 is too weak, and thus the back focal length is so long that the exit pupil of the main optical system ML is placed away from the image plane. This, although convenient to a solid-state imaging device such as a CCD, makes the entire taking optical system unduly large, and thus spoils its compactness.

Other conditions to be fulfilled are as follows. In a four-unit zoom lens system, like those of the first to fifth embodiments, that consists of, from the object side, a three-unit main optical system ML and a condenser lens unit CL, wherein the main optical system ML consists of a negative, a positive, and a negative lens unit, it is preferable that Condition (4) below be fulfilled.

$$0.5 < LBW/Y'\text{max} < 2.0 \qquad (4)$$

where

LBW represents the back focal length of the main optical system (ML) at the wide-angle end [W]; and Y' max represents the maximum image height.

Condition (4) defines the relation between the back focal length of the main optical system ML at the wide-angle end [W] (i.e. in the state in which the image-side-end surface of the main optical system ML comes closest to the image plane) and the size of the solid-state imaging device. If the upper limit of Condition (4) is exceeded, the back focal length is unduly long, and thus the total length of the taking optical system is too long for practical use. In contrast, if the lower limit of Condition (4) is exceeded, the back focal length is unduly short, which makes it difficult to arrange optical elements such as the low-pass filter LP properly.

In a four-unit zoom lens system, like those of the first to fifth embodiments, that consists of, from the object side, a three-unit main optical system ML and a condenser lens unit CL, wherein the main optical system ML consists of a negative, a positive, and a negative lens unit, it is preferable that Condition (5) below be fulfilled.

$$1.2 < bw/aw < 3.0 \qquad (5)$$

where aw represents the distance from the exit pupil of the main optical system (ML) to the image plane at the wide-angle end [W]; and bw represents the distance from the exit pupil of the taking optical system to the image plane at the wide-angle end [W].

Condition (5) defines the ratio of the distance between the exit pupil of the main optical system ML (which does not include the condenser lens unit CL) and the image plane to that between the exit pupil of the taking optical system (i.e. the entire taking optical system including the condenser lens unit CL) and the image plane. This distance ratio represents how far the condenser lens unit CL moves the exit pupil away from the image plane. If the lower limit of Condition (5) is exceeded, the exit pupil is located comparatively far away from the image plane even without the use of the condenser lens unit CL, and therefore its use makes little difference here. In addition, the fact that the exit pupil is located far away from the image plane is equivalent to the fact that the main optical system ML as a whole is too large for practical use. If the upper limit of Condition (5) is exceeded, the exit pupil of the taking optical system is placed too far away from the image plane. As a result, the aberrations occurring in the condenser lens unit CL cannot be corrected properly, and thus it is not possible to obtain satisfactory optical performance; in particular, positive distortion increases and image plane quality deteriorates.

In a four-unit zoom lens system, like those of the first to fifth embodiments, that consists of, from the object side, a three-unit main optical system ML and a condenser lens unit CL, wherein the main optical system ML consists of a negative, a positive, and a negative lens unit, it is preferable that, in addition to at least one of Conditions (1) to (3) noted above, at least one of Conditions (6) and (7) below be fulfilled.

$$1.5 < \phi 2/\phi T < 4.5 \qquad (6)$$

$$-4.0 < \phi 3/\phi T < -2.0 \qquad (7)$$

where $\phi T$ represents the optical power of the taking optical system at the telephoto end [T].

Conditions (6) and (7) define, in combination with Conditions (1) to (3), the conditions to be fulfilled to keep the entire taking optical system compact. If the upper limit of Condition (6) is exceeded, the positive optical power of the second lens unit Gr2 is too strong, and thus, even though the taking optical system can be made effectively compact, it is difficult to correct spherical aberration properly. In contrast, if the lower limit of Condition (6) is exceeded, the positive optical power of the second lens unit Gr2 is too weak, and thus the total length of the taking optical system is too long to keep the entire taking optical system compact.

If the lower limit of Condition (7) is exceeded, the negative optical power of the third lens unit Gr3 is too strong, and thus positive distortion becomes unduly large on the wide-angle side, and, in addition, spherical aberration appears toward the positive side on the telephoto side. Moreover, as the back focal length becomes shorter, the outer diameter of the third lens unit Gr3 needs to be made larger in order to secure sufficient amount of peripheral light. This makes the camera as a whole unduly large. Note that the aforementioned positive distortion observed on the wide-angle side and the spherical aberration observed on the telephoto side can be corrected effectively by providing an aspherical surface on a positive lens element included in the third lens unit Gr3. In contrast, if the upper limit of Condition (7) is exceeded, the negative optical power of the third lens unit Gr3 is too weak, and thus negative distortion becomes unduly large on the wide-angle side, and, in addition, spherical aberration appears toward the negative side on the telephoto side. Moreover, as the stroke of the third lens unit Gr3 increases, the total length of the taking optical system becomes too long on the telephoto side.

In cases where any one of Conditions (1) to (3) is satisfied, by providing an aspherical surface in the condenser lens unit CL, it is possible to suppress the aberrations occurring in the condenser lens unit CL to some extent. By providing an aspherical surface in the condenser lens unit CL, it is possible to give the condenser lens unit CL a stronger optical power and simultaneously correct properly the distortion occurring in the condenser lens unit CL. In this case, it is preferable that the aspherical surface provided in the condenser lens unit CL be so shaped that its positive optical power decreases (becomes weak) gradually from the center to the edge. By the use of such an aspherical surface, the negative distortion that occurs in the condenser lens unit CL can be corrected satisfactorily.

In addition, it is preferable that the aspherical surface provided in the condenser lens unit CL fulfill Condition (8) below.

$$-0.01 < PW \cdot (N'-N) \cdot \{x(y) - x(0)\} < 0.0 \qquad (8)$$

where

PW represents the optical power of the aspherical surface;

N' represents the refractive index of the medium that exists on the image side of the aspherical surface;

N represents the refractive index of the medium that exists on the object side of the aspherical surface;

x(y) represents the shape of the aspherical surface; and x(0) represents the shape of the reference spherical surface of the aspherical surface, where x(y) and x(0) are defined respectively by Formulae (AS) and (RE) below.

$$x(y) = (C0 \cdot y^2) / \left(1 + \sqrt{1 - \varepsilon \cdot C0^2 \cdot y^2}\right) + \sum (Ai \cdot y^i) \quad \text{(AS)}$$

$$x(0) = (C0 \cdot y^2) / \left(1 + \sqrt{1 - C0^2 \cdot y^2}\right) \quad \text{(RE)}$$

where y represents the height in a direction perpendicular to the optical axis;

ε represents the quadric surface parameter; and

Ai represents the aspherical coefficient of the ith order.

If the upper limit of Condition (8) is exceeded, the aspherical surface is no longer shaped such that its positive optical power decreases gradually from the center to the edge. Thus, it is impossible to correct distortion properly. In contrast, if the lower limit of Condition (8) is exceeded, the distortion is overcorrected.

Note that, in the taking optical systems of the first to fifth embodiments, the lens units are composed solely of refracting lens elements that deflect incoming rays through refraction. However, the lens units may include, for example, diffracting lens elements that deflect incoming rays through diffraction, refracting-diffracting hybrid-type lens elements that deflect incoming rays through the combined effect of refraction and diffraction, or lens elements of any other type.

Embodiments 6 to 9

Figure 12:
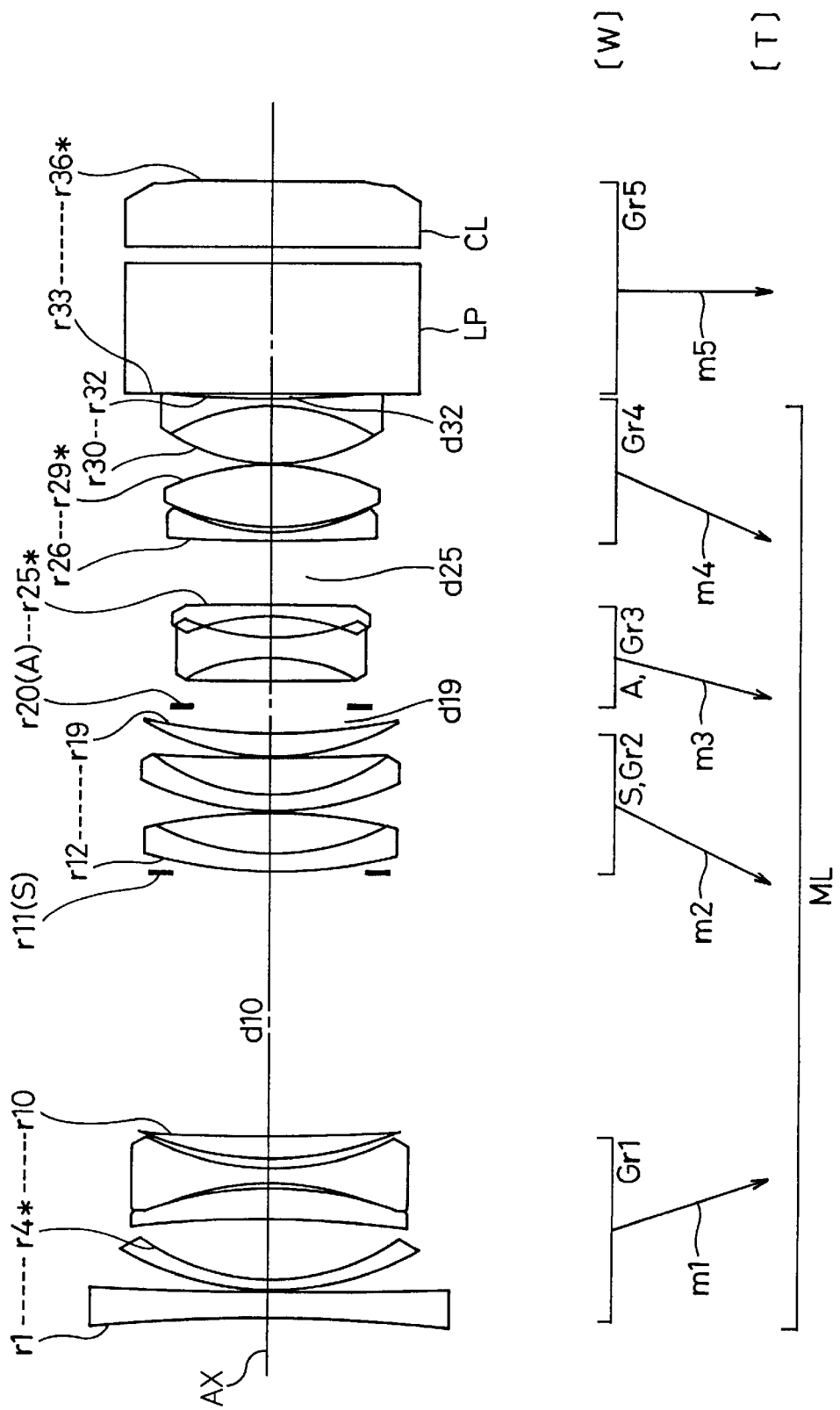
FIG. 12 is a lens arrangement diagram of the taking optical system of a seventh embodiment (Example 7) of the present invention.

FIGS. 11 to 14 show the lens arrangement of the taking optical systems of a sixth to a ninth embodiment, respectively, of the present invention, as observed at the wide-angle end [W]. In each lens arrangement diagram, arrow mi (i=1, 2, 3, . . . ) schematically indicates the movement of the ith lens unit (Gri) during zooming from the wide-angle end [W] to the telephoto end [T]. Moreover, in each lens arrangement diagram, a surface marked with ri (i=1, 2, 3, . . . ) is the ith surface counted from the object side, and a surface ri marked with an asterisk (*) is an aspherical surface. Furthermore, an axial distance marked with di (i=1, 2, 3, . . . ) is the ith axial distance counted from the object side, though only those axial distances between the lens units that vary with zooming are shown here.

The taking optical systems for video shooting of the sixth to ninth embodiments are all used to form an object image on a solid-state imaging device (not shown) and are each provided with, from the object side, a main optical system ML having a positive optical power, a low-pass filter LP, and a condenser lens unit CL having a positive optical power. The main optical system ML is composed of four zoom units that are, from the object side, a first lens unit Gr1 having a negative optical power, a second lens unit Gr2 having a positive optical power, a third lens unit Gr3 having a negative optical power, and a fourth lens unit Gr4 having a positive optical power. The low-pass filter LP and the condenser lens unit CL constitute a fifth lens unit Gr5 having a positive optical power.

The main optical system ML, on the one hand, acts as a four-unit zoom lens system (of a negative-positive-negative-positive configuration) having its own optical characteristics, and, on the other hand, acts as the principal portion of a five-unit zoom lens system (of a negative-positive-negative-positive-positive configuration) that constitutes a taking optical system as a whole and that includes, as its last lens unit (i.e. the fifth lens unit Gr5), a low-pass filter LP and a condenser lens unit CL that are kept in fixed positions during zooming. The condenser lens unit CL is placed between the main optical system ML and the solid-state imaging device and in the vicinity of the image plane. The condenser lens unit CL acts, by its positive optical power, to place the exit pupil of the taking optical system substantially at infinity.

Zooming is performed by varying the distances between the lens units. It should be noted that, since the fifth lens unit Gr5 is a fixed lens unit, the distance between the fourth lens unit Gr4 and the condenser lens unit CL also varies. In the sixth and seventh embodiments, between the surface disposed at the object-side end of the second lens unit Gr2 and the surface disposed at the image-side end of the first lens unit Gr1, a shielding plate (flare cutter) S is placed that moves together with the second lens unit Gr2 during zooming. Moreover, in the sixth to ninth embodiments, between the surface disposed at the image-side end of the second lens unit Gr2 and the surface disposed at the object-side end of the third lens unit Gr3, an aperture stop A is placed that moves together with the third lens unit Gr3 during zooming.

In the taking optical system of the sixth embodiment, the lens units constituting the main optical system ML are each composed, from the object side, as follows. The first lens unit Gr1 is composed of a positive biconvex lens element, a negative meniscus lens element concave to the image side, a positive meniscus lens element convex to the image side, a negative biconcave lens element, and a positive meniscus lens element convex to the object side. The second lens unit Gr2 is composed of a positive doublet biconvex lens element, a positive doublet meniscus lens element convex to the object side, and a positive meniscus lens element convex to the object side. The third lens unit Gr3 is composed of a doublet biconcave lens element and a negative meniscus lens element concave to the object side. The fourth lens unit Gr4 is composed of a negative meniscus lens element concave to the image side, a positive biconvex lens element, and a positive doublet meniscus lens element convex to the object side. The condenser lens unit CL is composed of a plano-convex lens element convex to the image side.

In the taking optical system of the seventh embodiment, the lens units constituting the main optical system ML are each composed, from the object side, as follows. The first lens unit Gr1 is composed of a negative biconcave lens element, a negative meniscus lens element concave to the image side, a positive meniscus lens element convex to the image side, a negative biconcave lens element, and a positive meniscus lens element convex to the object side. The second lens unit Gr2 is composed of a positive doublet biconvex lens element, a positive doublet meniscus lens element convex to the object side, and a positive meniscus lens element convex to the object side. The third lens unit Gr3 is composed of a negative doublet meniscus lens element concave to the image side and a negative meniscus lens element concave to the object side. The fourth lens unit Gr4 is composed of a negative meniscus lens element concave to the image side, a positive biconvex lens element, and a positive doublet meniscus lens element convex to the object side. The condenser lens unit CL is composed of a plano-convex lens element convex to the image side.

In the taking optical system of the eighth embodiment, the lens units constituting the main optical system ML are each composed, from the object side, as follows. The first lens unit Gr1 is composed of three negative meniscus lens elements concave to the image side and a positive meniscus lens element convex to the object side. The second lens unit Gr2 is composed of a positive doublet biconvex lens element and a positive meniscus lens element convex to the object side. The third lens unit Gr3 is composed of a negative doublet biconcave lens element. The fourth lens unit Gr4 is composed of a positive biconvex lens element, a positive meniscus lens element convex to the object side, and a negative biconcave lens element. The condenser lens unit CL is composed of a plano-convex lens element convex to the image side.

In the taking optical system of the ninth embodiment, the lens units constituting the main optical system ML are each composed, from the object side, as follows. The first lens unit Gr1 is composed of two negative meniscus lens elements concave to the image side and a positive meniscus lens element convex to the object side. The second lens unit Gr2 is composed of a positive doublet biconvex lens element and a negative meniscus lens element concave to the image side. The third lens unit Gr3 is composed of a negative doublet biconcave lens element. The fourth lens unit Gr4 is composed of two positive biconvex lens elements and a negative biconcave lens element. The condenser lens unit CL is composed of a plano-convex lens element convex to the image side.

As described previously, in a camera that is provided with a solid-state imaging device, it is preferable that light beams be shone perpendicularly onto the incident surface of the solid-state imaging device, and accordingly it is preferable that the exit pupil of the taking optical system be placed as far away from the image plane as possible. As described above, in all of the aforementioned embodiments, the condenser lens unit CL, which is disposed between the main optical system ML and the solid-state imaging device and in the vicinity of the image plane, acts, by its positive optical power, to place the exit pupil of the taking optical system substantially at infinity. By this action of the condenser lens unit CL, it is possible to place the exit pupil of the taking optical system as far away from the image plane as possible and thereby shorten the total length of the taking optical system. Moreover, in these embodiments, the exit pupil of the taking optical system can be placed away from the image plane with substantially no degradation in the image-formation performance of the main optical system ML, in striking contrast to a taking optical system having no condenser lens unit CL.

In a four-unit zoom lens system of a negative-positive-negative-positive configuration, the position of the exit pupil of the taking optical system depends principally on the optical power of the first lens unit Gr1. Thus, the optical power of the condenser lens unit CL is determined in accordance with the position of the exit pupil of the main optical system ML. For example, the stronger the optical power of the condenser lens unit CL, the stronger its action to place the exit pupil of the taking optical system away from the image plane. Thus, the closer the exit pupil of the main optical system ML is to the image plane, the stronger the optical power of the condenser lens unit CL needs to be. In contrast, the weaker the optical power of the condenser lens unit CL, the weaker its action to place the exit pupil of the taking optical system closer to the image plane. Thus, the farther the exit pupil of the main optical system ML is away from the image plane, the weaker the optical power of the condenser lens unit CL needs to be.

Moreover, since the main optical system ML itself acts as a zoom lens system, the exit pupil moves along the optical axis AX during zooming. Accordingly, it is preferable to strike a proper balance between the position of the exit pupil at the wide-angle end [W] and that at the telephoto end [T]. If this balance is neglected, the exit pupil is placed in an inappropriate position with respect to the solid-state imaging device at one of the wide-angle and telephoto ends. To strike a proper balance, it is preferable that at least one of Conditions (9) to (12) below be fulfilled that define the relation between the position of the exit pupil of the main optical system ML and the optical power of the condenser lens unit CL.

In a five-unit zoom lens system, like those of the sixth to ninth embodiments, that consists of, from the object side, a four-unit main optical system ML and a condenser lens unit CL, wherein the main optical system ML consists of a negative, a positive, a negative, and a positive lens unit, it is preferable that Condition (9) below be fulfilled.

$$-5.5 < \phi 1/\phi C < -0.4 \tag{9}$$

where $\phi 1$ represents the optical power of the first lens unit (Gr1); and $\phi C$ represents the optical power of the condenser lens unit (CL).

If the lower limit of Condition (9) is exceeded, the negative optical power of the first lens unit Gr1 is too strong, and thus the back focal length is so long that, even though the exit pupil of the main optical system ML is placed away from the image plane, the heights at which the incoming light beams enter the lens units other than the first lens unit are unduly great. As a result, it is difficult to correct the aberrations, in particular excessively large positive distortion and spherical aberration, that occur in the main optical system ML. In contrast, if the upper limit of Condition (9) is exceeded, the negative optical power of the first lens unit (Gr1) is too weak. This makes the heights at which the incoming light beams enter the lens units other than the first lens unit unduly low, and thus, even though distortion and spherical aberration can be corrected properly, the exit pupil is placed so close to the image plane that the condenser lens unit CL needs to have a stronger optical power. Increasing the power of the condenser lens unit CL causes aberrations therein; in particular a large Petzval sum causes unduly large astigmatic difference, which makes it impossible to correct aberrations properly.

In a five-unit zoom lens system, like those of the sixth to ninth embodiments, that consists of, from the object side, a four-unit main optical system ML and a condenser lens unit CL, wherein the main optical system ML consists of a negative, a positive, a negative, and a positive lens unit, it is preferable that Condition (10) below be fulfilled.

$$0.5 < \phi 2/\phi C < 7.0 \tag{10}$$

where $\phi 2$ represents the optical power of the second lens unit (Gr2); and $\phi C$ represents the optical power of the condenser lens unit (CL).

If the upper limit of Condition (10) is exceeded, the positive optical power of the second lens unit Gr2 is too strong. This increases the distance between the first lens unit Gr1 and the second lens unit Gr2 on the wide-angle side, and thus, in the entire taking optical system, makes the retrofocus-type power distribution (negative-positive power arrangement) so significant that it is possible to secure a sufficient back focal length. Accordingly, even though the exit pupil can be placed sufficiently away from the image plane, the entire taking optical system becomes unduly large. In contrast, if the lower limit of Condition (10) is exceeded, the positive optical power of the second lens unit Gr2 is too weak. This makes the retrofocus-type power distribution so insignificant that the back focal length becomes unduly short. Accordingly, the condenser lens unit CL needs to have a stronger optical power in order to place the exit pupil away from the image plane. However, an excessive increase in the optical power of the condenser lens unit CL causes the positive optical power of the entire taking optical system to become too strong. As a result, the Petzval sum becomes too large to obtain satisfactory image plane quality.

In a five-unit zoom lens system, like those of the sixth to ninth embodiments, that consists of, from the object side, a four-unit main optical system ML and a condenser lens unit CL, wherein the main optical system ML consists of a negative, a positive, a negative, and a positive lens unit, it is preferable that Condition (11) below be fulfilled.

$$-7.0 < \phi 3/\phi C < -0.5 \tag{11}$$

where $\phi 3$ represents the optical power of the third lens unit (Gr3); and $\phi C$ represents the optical power of the condenser lens unit (CL).

If the lower limit of Condition (11) is exceeded, the negative optical power of the third lens unit Gr3 is too strong. This makes the entire taking optical system telephoto-oriented and compact, but simultaneously makes the back focal length so short that the exit pupil is placed too close to the image plane. Accordingly, the condenser lens unit CL needs to be given a stronger optical power. However, an excessive increase in the optical power of the condenser lens unit CL causes aberrations therein; in particular excessively large positive distortion and a large Petzval sum cause unduly large astigmatic difference. This makes it difficult to correct aberrations properly. In contrast, if the upper limit of Condition (11) is exceeded, the negative optical power of the third lens unit Gr3 is too weak, and thus the back focal length is so long that the exit pupil of the main optical system ML is placed away from the image plane. This, although convenient to a solid-state imaging device such as a CCD, makes the entire taking optical system unduly large, and thus spoils its compactness.

In a five-unit zoom lens system, like those of the sixth to ninth embodiments, that consists of, from the object side, a four-unit main optical system ML and a condenser lens unit CL, wherein the main optical system ML consists of a negative, a positive, a negative, and a positive lens unit, it is preferable that Condition (12) below be fulfilled.

$$1.0 < \phi 4/\phi C < 5.0 \tag{12}$$

where $\phi 4$ represents the optical power of the fourth lens unit (Gr4); and $\phi C$ represents the optical power of the condenser lens unit (CL).

Condition (12) defines the ratio of the optical power of the fourth lens unit Gr4 to that of the condenser lens unit CL. If the lower limit of Condition (12) is exceeded, the positive optical power of the fourth lens unit Gr4 is too weak relative to that of the condenser lens unit CL, and thus the back focal length is unnecessarily long. This makes it impossible to make the zoom lens system compact. In contrast, if the upper limit of Condition (12) is exceeded, the positive optical power of the fourth lens unit Gr4 is too strong relative to that of the condenser lens unit CL, and thus the back focal length is too short. In this case, it is impossible to keep the entire zoom lens system sufficiently telecentric unless the condenser lens unit CL is given a stronger optical power. However, increasing the optical power of the condenser lens unit CL results in increasing the aberrations occurring therein.

Other conditions to be fulfilled are as follows. In a five-unit zoom lens system, like those of the sixth to ninth embodiments, that consists of, from the object side, a four-unit main optical system ML and a condenser lens unit CL, wherein the main optical system ML consists of a negative, a positive, a negative, and a positive lens unit, it is preferable that Condition (13) below be fulfilled.

$$0.5 < LBW/Y'\max < 2.0 \tag{13}$$

where

LBW represents the back focal length of the main optical system (ML) at the wide-angle end [W]; and Y' max represents the maximum image height.

Condition (13) defines the relation between the back focal length of the main optical system ML at the wide-angle end [W] (i.e. in the state in which the image-side-end surface of the main optical system ML comes closest to the image plane) and the size of the solid-state imaging device. If the upper limit of Condition (13) is exceeded, the back focal length is unduly long, and thus the total length of the taking optical system is too long for practical use. In contrast, if the lower limit of Condition (13) is exceeded, the back focal length is unduly short, which makes it difficult to arrange optical elements such as the low-pass filter LP properly.

In a five-unit zoom lens system, like those of the sixth to ninth embodiments, that consists of, from the object side, a four-unit main optical system ML and a condenser lens unit CL, wherein the main optical system ML consists of a negative, a positive, a negative, and a positive lens unit, it is preferable that Condition (14) below be fulfilled.

$$1.2 < bw/aw < 3.0 \tag{14}$$

where aw represents the distance from the exit pupil of the main optical system (ML) to the image plane at the wide-angle end [W]; and bw represents the distance from the exit pupil of the taking optical system to the image plane at the wide-angle end [W].

Condition (14) defines the ratio of the distance between the exit pupil of the main optical system ML (which does not include the condenser lens unit CL) and the image plane to that between the exit pupil of the taking optical system (i.e. the entire taking optical system including the condenser lens unit CL) and the image plane. This distance ratio represents how far the condenser lens unit CL moves the exit pupil away from the image plane. If the lower limit of Condition (14) is exceeded, the exit pupil is located comparatively far away from the image plane even without the use of the condenser lens unit CL, and therefore its use makes little difference here. In addition, the fact that the exit pupil is located far away from the image plane is equivalent to the fact that the main optical system ML as a whole is too large for practical use. If the upper limit of Condition (14) is exceeded, the exit pupil of the taking optical system is placed too far away from the image plane. As a result, the aberrations occurring in the condenser lens unit CL cannot be corrected properly, and thus it is not possible to obtain satisfactory optical performance; in particular, positive distortion increases and image plane quality deteriorates.

In a five-unit zoom lens system, like those of the sixth to ninth embodiments, that consists of, from the object side, a four-unit main optical system ML and a condenser lens unit CL, wherein the main optical system ML consists of a negative, a positive, a negative, and a positive lens unit, it is preferable that, in addition to at least one of Conditions (9) to (12) noted above, Condition (15) below be fulfilled.

$$0.600 < \phi 2/\phi W < 0.900 \qquad (15)$$

where $\phi W$ represents the optical power of the taking optical system at the wide-angle end [W].

Condition (15) defines, in combination with Conditions (9) to (12), the condition to be fulfilled to obtain the optimal optical performance in the taking optical system. If the upper limit of Condition (15) is exceeded, the positive optical power of the second lens unit Gr2 is too strong, and thus, even though it is possible to secure a sufficient back focal length, too much flare occurs toward the upper side, which makes it difficult to correct aberrations properly. In contrast, if the lower limit of Condition (15) is exceeded, the optical power of the second lens unit Gr2 is too weak, and thus, even though aberrations can be corrected properly, it is difficult to secure a sufficient back focal length, particularly on the wide-angle side. This necessitates, in a taking optical system designed for use with a solid-state imaging device such as a CCD, the use of an additional optical element such as a low-pass filter, and thus complicates the design of the taking optical system.

In cases where any one of Conditions (9) to (12) is satisfied, by providing an aspherical surface in the condenser lens unit CL, it is possible to suppress the aberrations occurring in the condenser lens unit CL to some extent. By providing an aspherical surface in the condenser lens unit CL, it is possible to give the condenser lens unit CL a stronger optical power and simultaneously correct properly the distortion occurring in the condenser lens unit CL. In this case, it is preferable that the aspherical surface provided in the condenser lens unit CL be so shaped that its positive optical power decreases (becomes weak) gradually from the center to the edge. By the use of such an aspherical surface, the negative distortion that occurs in the condenser lens unit CL can be corrected satisfactorily.

In addition, it is preferable that the aspherical surface provided in the condenser lens unit CL fulfill Condition (16) below.

$$-0.01 < PW \cdot (N'-N) \cdot \{x(y)-x(0)\} < 0.0 \qquad (16)$$

where

PW represents the optical power of the aspherical surface;

N' represents the refractive index of the medium that exists on the image side of the aspherical surface;

N represents the refractive index of the medium that exists on the object side of the aspherical surface;

x(y) represents the shape of the aspherical surface; and x(0) represents the shape of the reference spherical surface of the aspherical surface, where x(y) and x(0) are defined respectively by Formulae (AS) and (RE) below.

$$x(y) = (C0 \cdot y^2) / \left(1 + \sqrt{1 - \varepsilon \cdot C0^2 \cdot y^2}\right) + \sum (Ai \cdot y^i) \qquad (AS)$$

$$x(0) = (C0 \cdot y^2) / \left(1 + \sqrt{1 - C0^2 \cdot y^2}\right) \qquad (RE)$$

where y represents the height in a direction perpendicular to the optical axis;

$\varepsilon$ represents the quadric surface parameter; and

Ai represents the aspherical coefficient of the ith order.

If the upper limit of Condition (16) is exceeded, the aspherical surface is no longer shaped such that its positive optical power decreases gradually from the center to the edge. Thus, it is impossible to correct distortion properly. In contrast, if the lower limit of Condition (16) is exceeded, the distortion is overcorrected.

Note that, in the taking optical systems of the sixth to ninth embodiments, the lens units are composed solely of refracting lens elements that deflect incoming rays through refraction. However, the lens units may include, for example, diffracting lens elements that deflect incoming rays through diffraction, refracting-diffracting hybrid-type lens elements that deflect incoming rays through the combined effect of refraction and diffraction, or lens elements of any other type.

EXAMPLES

Hereinafter, examples of the taking optical systems for video shooting of the first to ninth embodiments described above will be presented with reference to their construction data, graphic representations of aberrations, and other data. Tables 1 to 9 list the construction data of Examples 1 to 9, which respectively correspond to the first to ninth embodiments described above and have lens arrangements as shown in FIGS. 1 to 5 and 11 to 14.

In the construction data of each example, ri (i=1, 2, 3, . . . ) represents the radius of curvature of the ith surface counted from the object side, and di (i=1, 2, 3, . . . ) represents the ith axial distance counted from the object side. For each of the axial distances that vary with zooming (i.e. variable axial distances), three values are listed that represent, from left, the actual surface-to-surface distance between the relevant lens units at the wide-angle end [W], the same distance at the middle focal length (M), and the same distance at the telephoto end [T]. Ni (i=1, 2, 3, . . . ) and vi (i=1, 2, 3, . . . ) represent the refractive index (Nd) and the Abbe number (vd), respectively, for d-line of the ith lens element counted from the object side. Also listed are the focal lengths f and the F numbers FNO of the entire taking optical system at the wide-angle end [W], at the middle focal length (M), and at the telephoto end [T].

Furthermore, a surface whose radius of curvature ri is marked with an asterisk (*) is an aspherical surface, whose surface shape is defined by Formula (AS) noted above. The data of the aspherical surfaces and the values corresponding to Condition (8) or (16), which defines a condition to be fulfilled by the aspherical surface, are also listed together with the construction data of each embodiment. Table 10 lists the values corresponding to Conditions (1) to (7) noted above as observed in Examples 1 to 5. Table 11 lists the values corresponding to Conditions (9) to (15) noted above as observed in Examples 6 to 9.

Figure 6A:
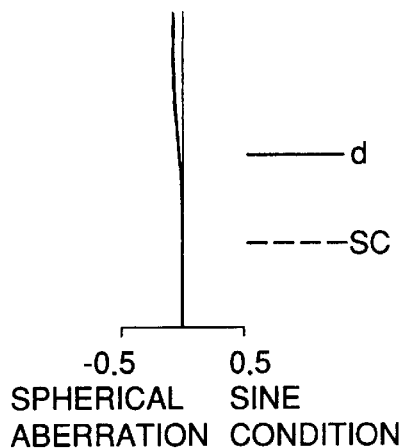
FIGS. 6A to 6I are graphic representations of the aberrations observed in the taking optical system of Example 1.
Figure 6B:
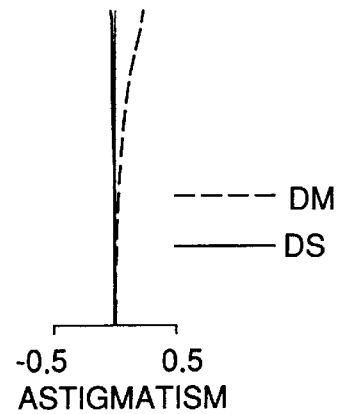
Figure 6C:
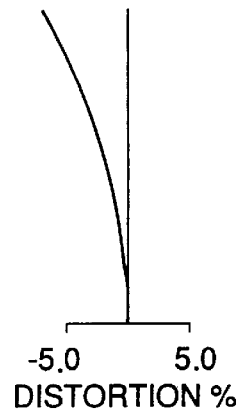
Figure 6D:
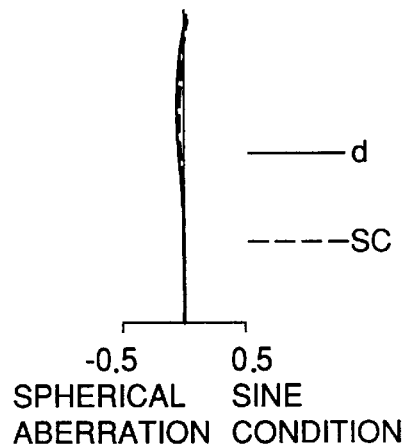
Figure 6E:
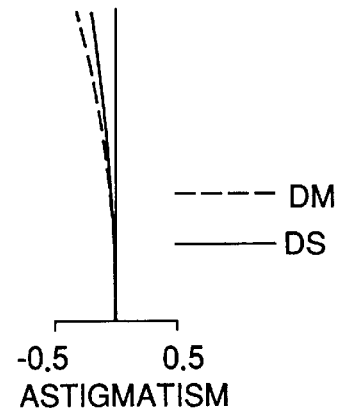
Figure 6F:
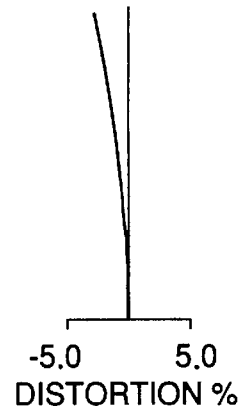
Figure 6G:
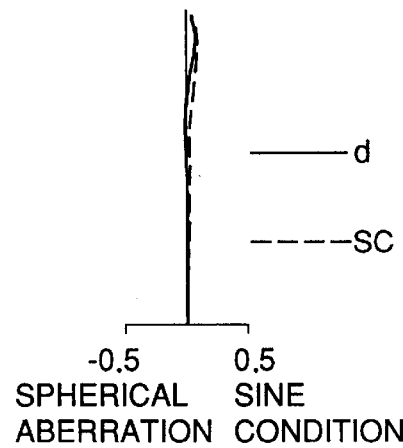
Figure 6H:
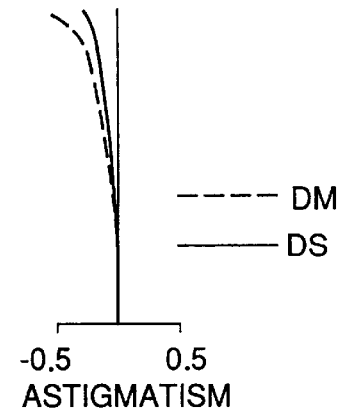
Figure 6I:
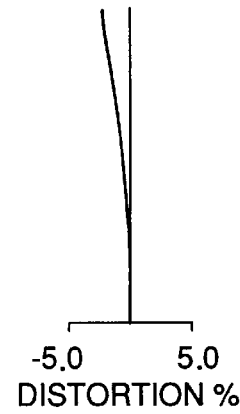
Figure 7A:
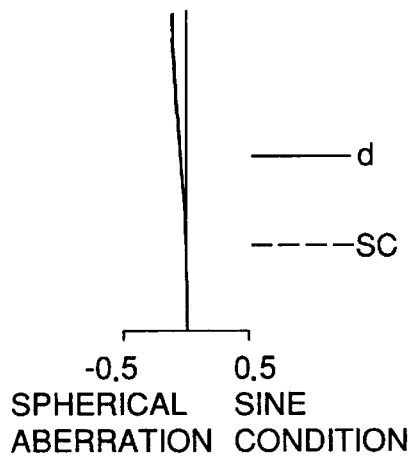
FIGS. 7A to 7I are graphic representations of the aberrations observed in the taking optical system of Example 2.
Figure 7B:
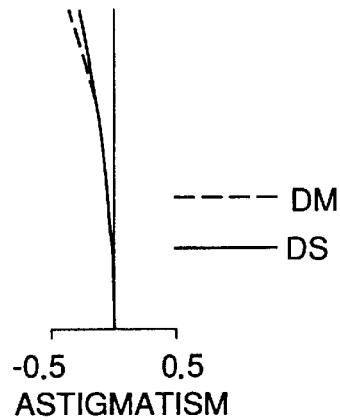
Figure 7C:
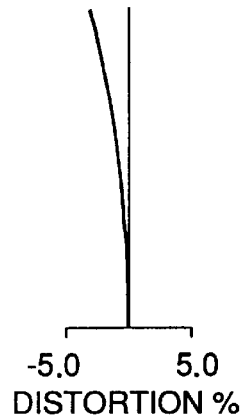
Figure 7D:
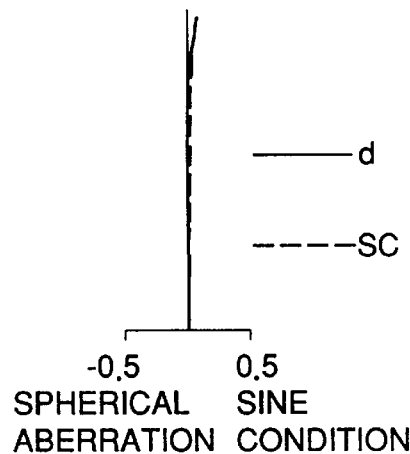
Figure 7E:
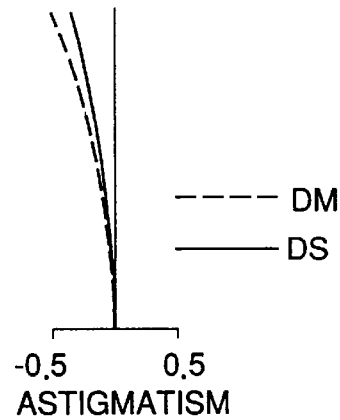
Figure 7F:
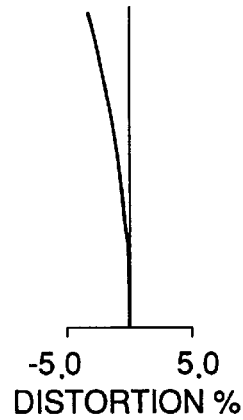
Figure 7G:
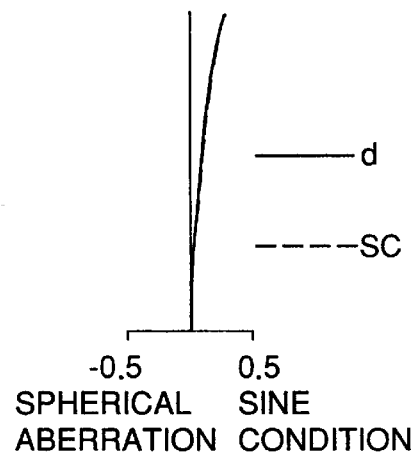
Figure 7H:
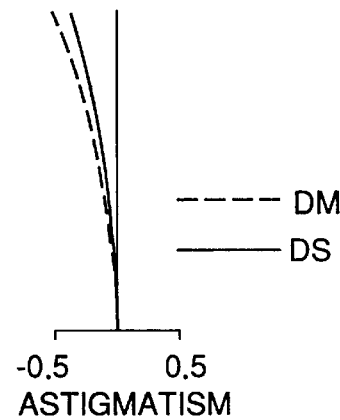
Figure 7I:
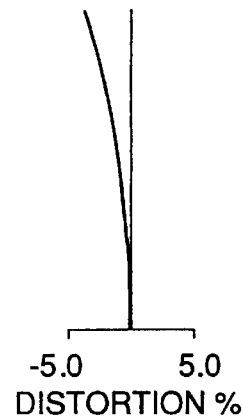
Figure 9A:
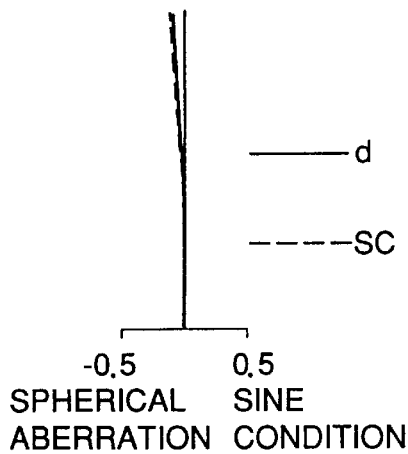
FIGS. 9A to 9I are graphic representations of the aberrations observed in the taking optical system of Example 4.
Figure 9B:
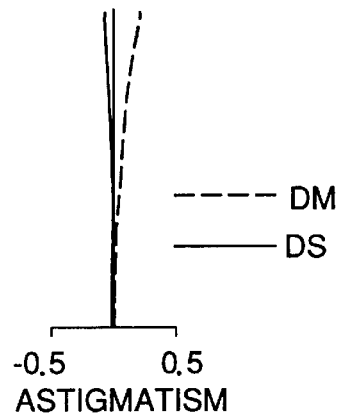
Figure 9C:
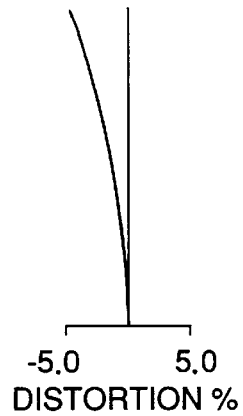
Figure 9D:
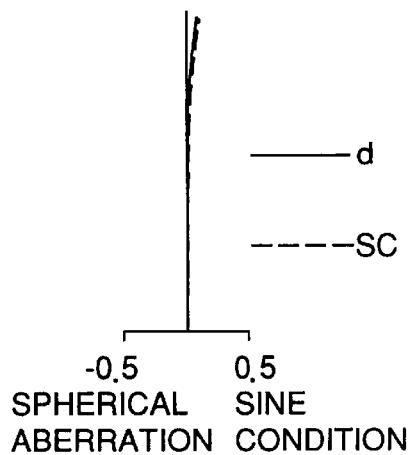
Figure 9E:
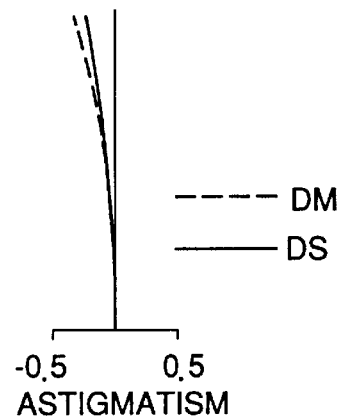
Figure 9F:
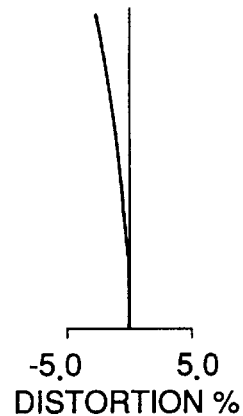
Figure 9G:
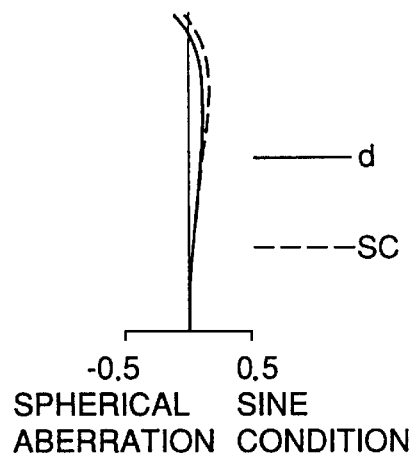
Figure 9H:
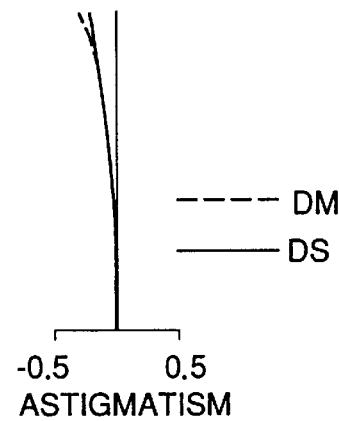
Figure 9I:
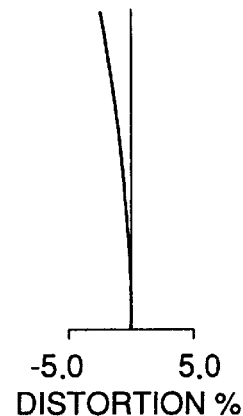
Figure 10A:
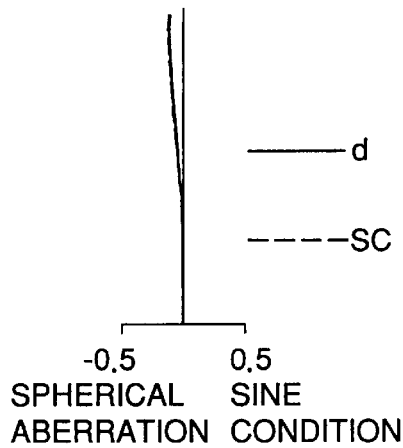
FIGS. 10A to 10I are graphic representations of the aberrations observed in the taking optical system of Example 5.
Figure 10B:
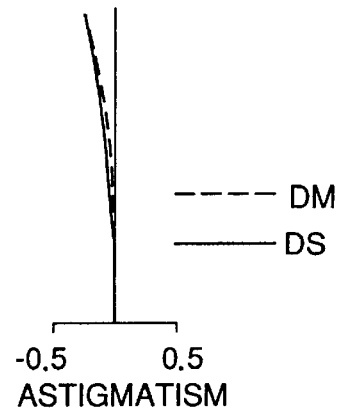
Figure 10C:
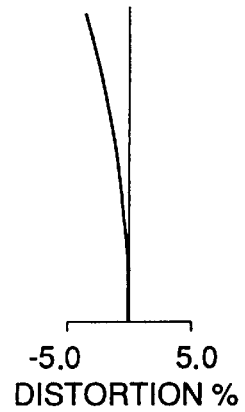
Figure 10D:
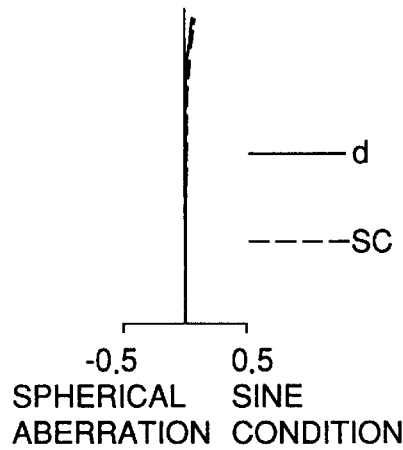
Figure 10E:
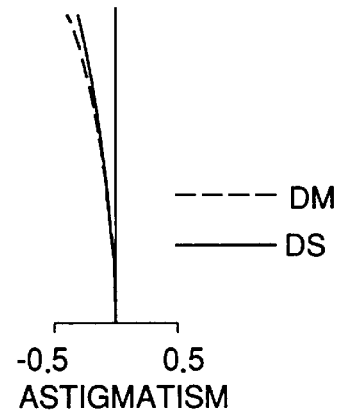
Figure 10F:
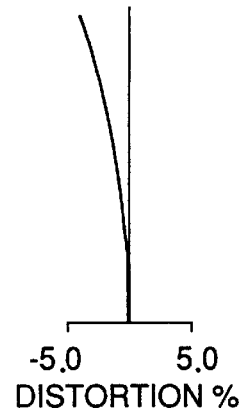
Figure 10G:
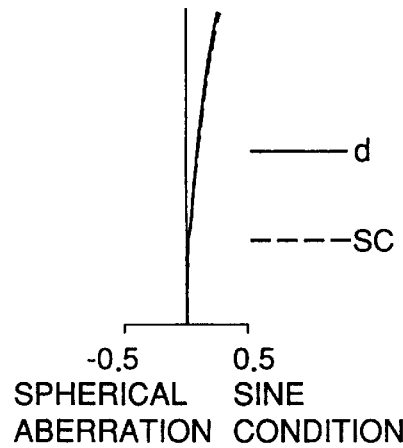
Figure 10H:
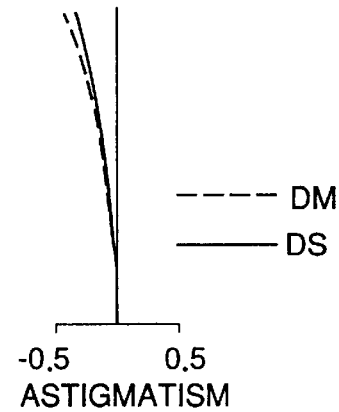
Figure 10I:
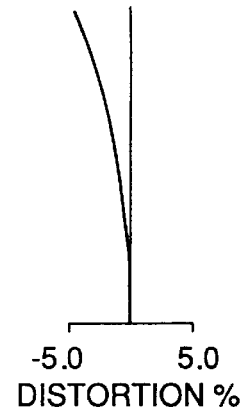
Figure 15A:
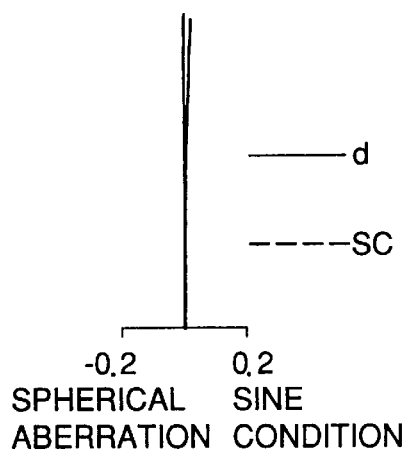
FIGS. 15A to 15I are graphic representations of the aberrations observed in the taking optical system of Example 6.
Figure 15B:
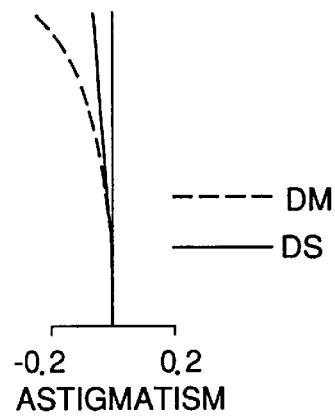
Figure 15C:
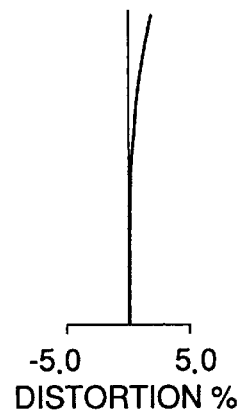
Figure 15D:
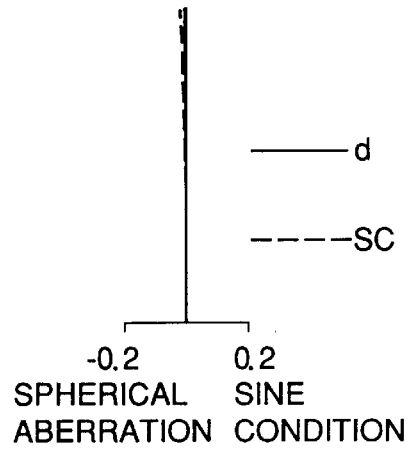
Figure 15E:
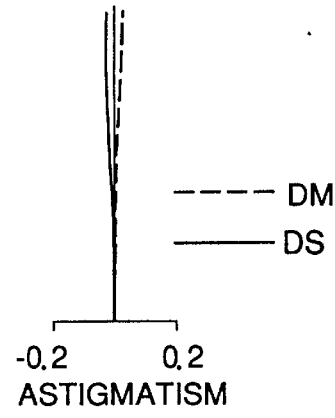
Figure 15F:
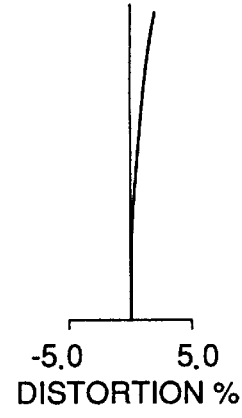
Figure 15G:
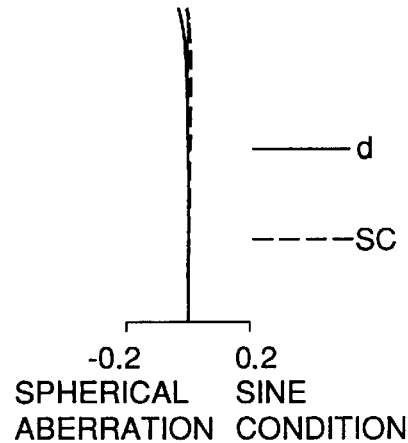
Figure 15H:
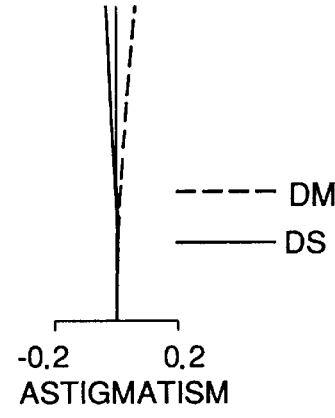
Figure 15I:
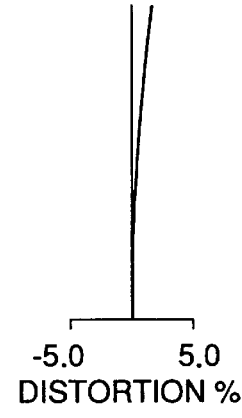
Figure 16A:
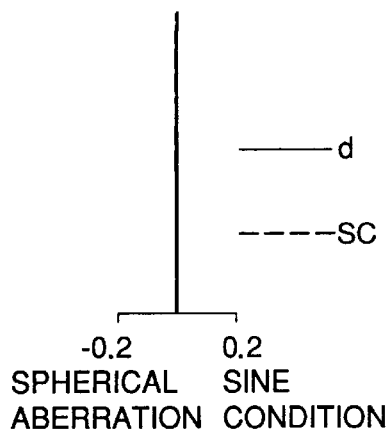
FIGS. 16A to 16I are graphic representations of the aberrations observed in the taking optical system of Example 7.
Figure 16B:
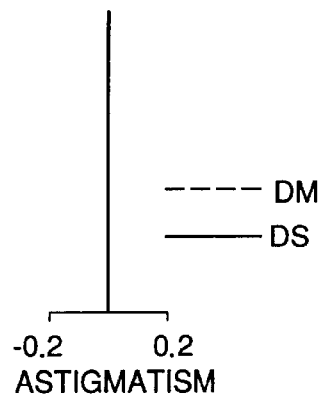
Figure 16C:
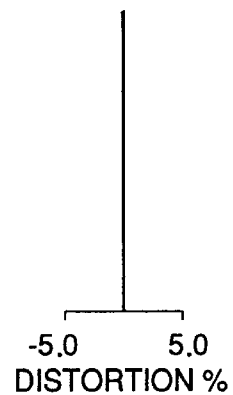
Figure 16D:
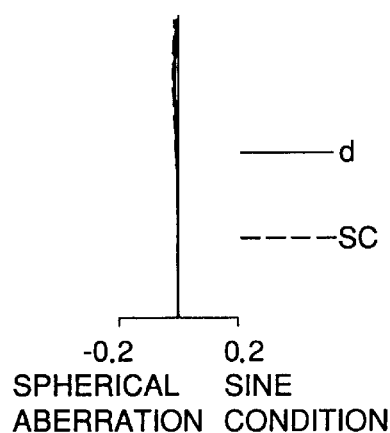
Figure 16E:
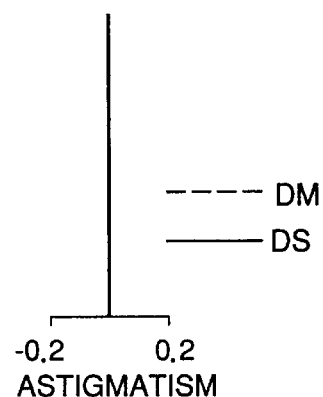
Figure 16F:
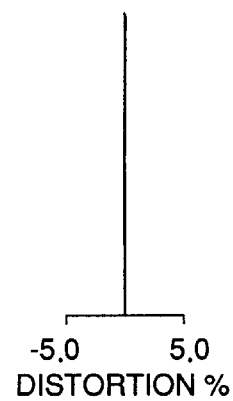
Figure 16G:
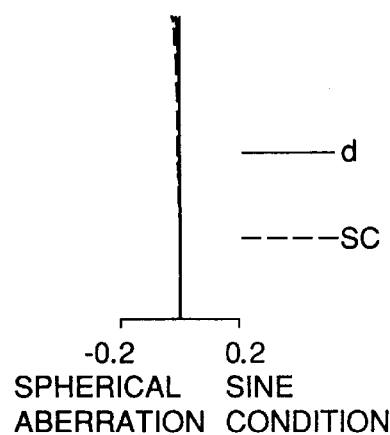
Figure 16H:
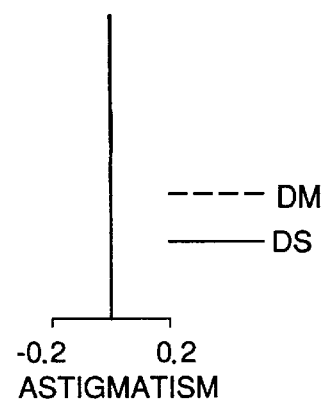
Figure 16I:
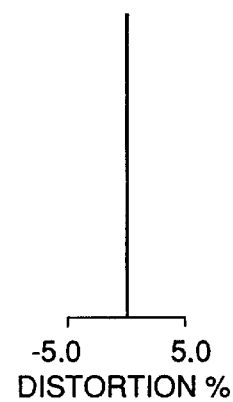
Figure 17A:
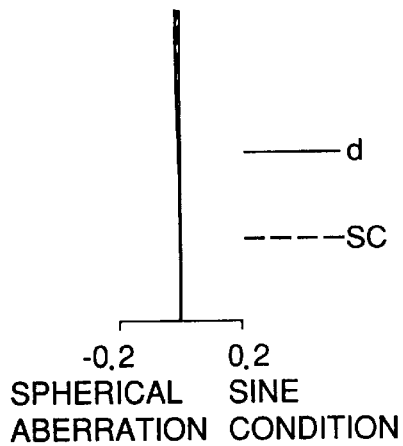
FIGS. 17A to 17I are graphic representations of the aberrations observed in the taking optical system of Example 8.
Figure 17B:
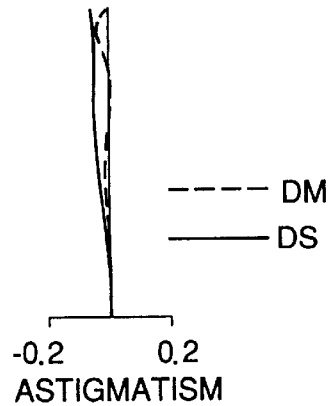
Figure 17C:
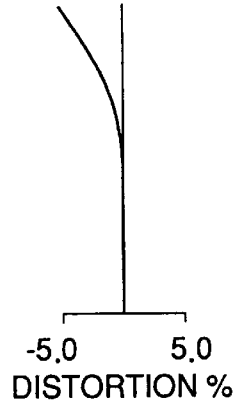
Figure 17D:
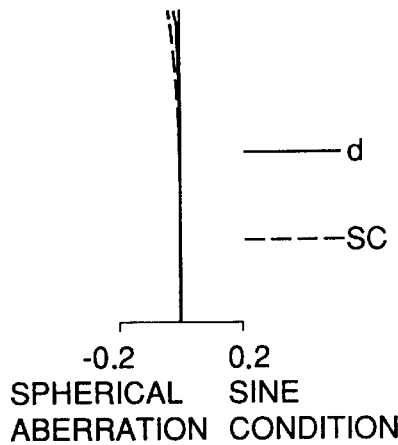
Figure 17E:
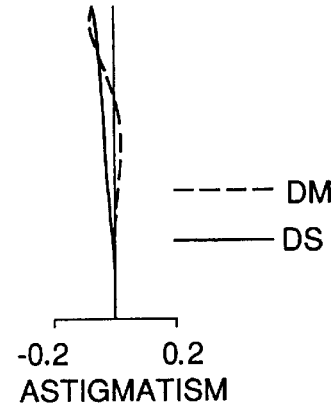
Figure 17F:
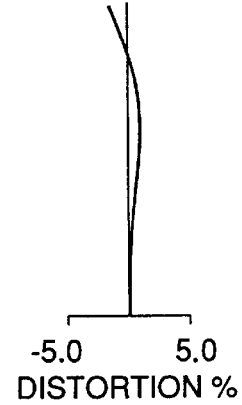
Figure 17G:
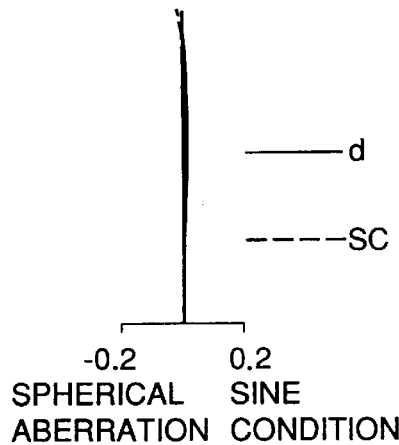
Figure 17H:
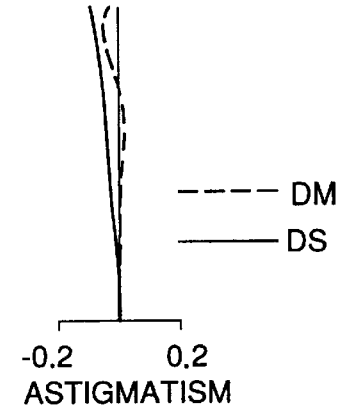
Figure 17I:
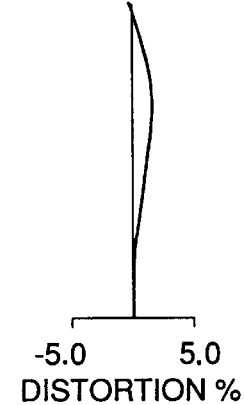

FIGS. 6A to 6I, 7A to 7I, 8A to 8I, 9A to 9I, 10A to 10I, 15A to 15I, 16A to 16I, 17A to 17I, and 18A to 18I are graphic representations of the aberrations observed in Examples 1 to 9, respectively. Of these diagrams, FIGS. 6A to 6C, 7A to 7C, 8A to 8C, 9A to 9C, 10A to 10C, 15A to 15C, 16A to 16C, 17A to 17C, and 18A to 18C show the aberrations observed at the wide-angle end [W]; FIGS. 6D to 6F, 7D to 7F, 8D to 8F, 9D to 9F, 10D to 10F, 15D to 15F, 16D to 16F, 17D to 17F, and 18D to 18F show the aberrations observed at the middle focal length [M]; and FIGS. 6G to 6I, 7G to 7I, 8G to 8I, 9G to 9I, 10G to 10I, 15G to 15I, 16G to 16I, 17G to 17I, and 18G to 18I show the aberrations observed at the telephoto end [T]. Of these diagrams, FIGS. 6A, 6D, 6G, 7A, 7D, 7G, 8A, 8D, 8G, 9A, 9D, 9G, 10A, 10D, 10G, 15A, 15D 17A, 17D, 17G, 18A, 18D, and 18G show spherical aberration and sine condition; FIGS. 6B, 6E, 6H, 7B, 7E, 7H, 8B, 8E, 8H, 9B, 9E, 9H, 10B, 10E, 10H, 15B, 15E, 15H, 16B, 16E, 16H, 17B, 17E, 17H, 18B, 18E, and 18H show astigmatism; and FIGS. 6C, 6F, 6I, 7C, 7F, 7I, 8C, 8F, 8I, 9C, 9F, 9I, 10C, 10F, 10I, 15C, 15F, 15I, 16C, 16F, 16I, 17C, 17F, 17I, 18C, 18F, and 18I show distortion (Y': image height). In the spherical aberration diagrams, the solid line (d) represents the aberration for d-line and the broken line (SC) represents the sine condition. In the astigmatism diagrams, the broken line (DM) and the solid line (DS) represent the astigmatism for d-line on the meridional plane and on the sagittal plane, respectively.

As described heretofore, according to the present invention, it is possible to place the exit pupil of a taking optical system away from the image plane even when the taking optical system is made compact. Accordingly, it is possible to realize a taking optical system that has a relatively short total length despite having its exit pupil substantially at infinity. By the use of such a taking optical system, it is possible to suppress the loss of brightness at the edges of images shot by a solid-state imaging device, and thereby obtain uniformly bright images.

TABLE 1

<<Construction Data of Example 1>>
f = 8.2~15.0~27.0
FNO = 4.12~6.10~8.24

| Radius of Curvature | Axial Distance | Refractive Index | Abbe Number |
|---|---|---|---|
| r1 = −47.224 | | | |
| | d1 = 0.500 | N1 = 1.80100 | v1 = 46.54 |
| r2 = 5.757 | | | |
| | d2 = 0.700 | | |
| r3 = 6.528 | | | |
| | d3 = 1.450 | N2 = 1.83350 | v2 = 21.00 |
| r4 = 14.092 | | | |
| | d4 = 5.831~3.163~0.427 | | |
| r5 = ∞ (Flare Cutter S) | | | |
| | d5 = 1.308 | | |
| r6* = 3.715 | | | |
| | d6 = 1.250 | N3 = 1.57885 | v3 = 69.57 |
| r7* = −63.854 | | | |
| | d7 = 0.100 | | |
| r8 = 308.501 | | | |
| | d8 = 0.981 | N4 = 1.84666 | v4 = 23.82 |
| r9 = 4.385 | | | |
| | d9 = 0.435 | | |
| r10 = 8.637 | | | |
| | d10 = 1.095 | N5 = 1.65446 | v5 = 33.86 |
| r11 = −7.370 | | | |
| | d11 = 0.569 | | |
| r12 = ∞ (Aperture Stop A) | | | |
| | d12 = 3.351~1.809~1.784 | | |
| r13* = −18.214 | | | |
| | d13 = 1.000 | N6 = 1.58340 | v6 = 30.23 |
| r14 = −6.471 | | | |
| | d14 = 1.000 | | |
| r15 = −3.812 | | | |
| | d15 = 0.310 | N7 = 1.78831 | v7 = 47.32 |

TABLE 1-continued

<<Construction Data of Example 1>>
f = 8.2~15.0~27.0
FNO = 4.12~6.10~8.24

| Radius of Curvature | Axial Distance | Refractive Index | Abbe Number |
|---|---|---|---|
| r16 = −21.539 | | | |
| | d16 = 0.200~7.111~15.172 | | |
| r17 = ∞ | | | |
| | d17 = 4.000 | N8 = 1.51680 | v8 = 64.20 |
| r18 = ∞ | | | |
| | d18 = 0.200 | | |
| r19 = ∞ | | | |
| | d19 = 0.800 | N9 = 1.77250 | v9 = 49.77 |
| r20 = −11.111 | | | |
| | Σd = 25.079~27.779~33.079 | | |

[Aspherical Coefficients of 6th Surface (r6)]

$\epsilon = 1.0000$
$A4 = -0.81615 \times 10^{-3}$
$A6 = 0.84500 \times 10^{-4}$
$A8 = -0.77756 \times 10^{-4}$
$A10 = 0.13292 \times 10^{-4}$
$A12 = -0.12185 \times 10^{-5}$

[Aspherical Coefficients of 7th Surface (r7)]

$\epsilon = 1.0000$
$A4 = 0.18470 \times 10^{-2}$
$A6 = -0.10277 \times 10^{-4}$
$A8 = -0.47766 \times 10^{-4}$
$A10 = 0.82440 \times 10^{-5}$
$A12 = -0.84956 \times 10^{-6}$

[Aspherical Coefficients of 13th Surface (r13)]

$\epsilon = 1.0000$
$A4 = 0.12450 \times 10^{-2}$
$A6 = -0.17142 \times 10^{-3}$
$A8 = 0.58540 \times 10^{-4}$
$A10 = -0.64512 \times 10^{-5}$
$A12 = 0.35323 \times 10^{-6}$

TABLE 2

<<Construction Data of Example 2>>
f = 8.1~11.3~15.6
FNO = 3.62~4.68~5.86

| Radius of Curvature | Axial Distance | Refractive Index | Abbe Number |
|---|---|---|---|
| r1 = −276.988 | | | |
| | d1 = 0.800 | N1 = 1.80100 | v1 = 46.54 |
| r2 = 8.848 | | | |
| | d2 = 1.100 | | |
| r3 = 8.297 | | | |
| | d3 = 2.000 | N2 = 1.83400 | v2 = 37.05 |
| r4 = 12.519 | | | |
| | d4 = 6.600~4.452~1.924 | | |
| r5 = ∞ (Flare Cutter S) | | | |
| | d5 = 0.200 | | |
| r6 = 2.680 | | | |
| | d6 = 1.900 | N3 = 1.48749 | v3 = 70.44 |
| r7 = −10.547 | | | |
| | d7 = 0.160 | | |
| r8* = −5.032 | | | |
| | d8 = 0.797 | N4 = 1.84666 | v4 = 23.82 |
| r9* = −9.935 | | | |
| | d9 = 0.398 | | |
| r10 = ∞ (Aperture Stop A) | | | |
| | d10 = 2.279~1.292~0.900 | | |
| r11* = −6.671 | | | |
| | d11 = 0.640 | N5 = 1.58340 | v5 = 30.23 |
| r12* = −7.249 | | | |
| | d12 = 1.500 | | |

TABLE 2-continued

<<Construction Data of Example 2>>
f = 8.1~11.3~15.6
FNO = 3.62~4.68~5.86

| Radius of Curvature | Axial Distance | Refractive Index | Abbe Number |
|---|---|---|---|
| r13 = −2.938 | | | |
| | d13 = 0.300 | N6 = 1.51823 | ν6 = 58.96 |
| r14 = −7.236 | | | |
| | d14 = 0.200~3.336~6.255 | | |
| r15 = ∞ | | | |
| | d15 = 1.500 | N7 = 1.51680 | ν7 = 64.20 |
| r16 = ∞ | | | |
| | d16 = 0.200 | | |
| r17 = ∞ | | | |
| | d17 = 1.900 | N8 = 1.64050 | ν8 = 60.08 |
| r18 = −7.407 | | | |
| | Σd = 22.474~22.474~22.474 | | |

[Aspherical Coefficients of 8th Surface (r8)]

$\epsilon = 1.0000$
$A4 = 0.44421 \times 10^{-2}$
$A6 = 0.14294 \times 10^{-2}$
$A8 = -0.10774 \times 10^{-3}$
$A10 = -0.13632 \times 10^{-4}$

[Aspherical Coefficients of 9th Surface (r9)]

$\epsilon = 1.0000$
$A4 = 0.93343 \times 10^{-2}$
$A6 = 0.17133 \times 10^{-2}$
$A8 = 0.17999 \times 10^{-3}$
$A10 = 0.10903 \times 10^{-4}$

[Aspherical Coefficients of 11th Surface (r11)]

$\epsilon = 1.0000$
$A3 = 0.70260 \times 10^{-3}$
$A4 = 0.11884 \times 10^{-2}$
$A5 = 0.15588 \times 10^{-2}$
$A6 = 0.44258 \times 10^{-4}$
$A7 = -0.78636 \times 10^{-4}$
$A8 = 0.14030 \times 10^{-3}$
$A9 = -0.66205 \times 10^{-4}$
$A10 = 0.11538 \times 10^{-4}$
$A11 = 0.10503 \times 10^{-6}$
$A12 = 0.12478 \times 10^{-5}$

[Aspherical Coefficients of 12th Surface (r12)]

$\epsilon = 1.0000$
$A4 = 0.25074 \times 10^{-2}$
$A5 = 0.22417 \times 10^{-3}$
$A6 = 0.14899 \times 10^{-3}$
$A7 = 0.68389 \times 10^{-5}$
$A8 = 0.24089 \times 10^{-4}$
$A9 = -0.40559 \times 10^{-4}$
$A10 = 0.21298 \times 10^{-4}$
$A11 = -0.50301 \times 10^{-6}$
$A12 = 0.15328 \times 10^{-9}$

TABLE 3

<<Construction Data of Example 3>>
f = 8.2~12.5~20.9
FNO = 3.61~4.95~6.97

| Radius of Curvature | Axial Distance | Refractive Index | Abbe Number |
|---|---|---|---|
| r1 = 82.152 | | | |
| | d1 = 0.510 | N1 = 1.85000 | ν1 = 40.04 |
| r2 = 5.775 | | | |
| | d2 = 0.720 | | |
| r3 = 6.688 | | | |
| | d3 = 1.700 | N2 = 1.84666 | ν2 = 23.82 |
| r4 = 13.680 | | | |
| | d4 = 7.492~4.574~0.533 | | |
| r5* = 3.457 | | | |
| | d5 = 1.300 | N3 = 1.57885 | ν3 = 69.57 |
| r6* = −42.701 | | | |
| | d6 = 0.100 | | |
| r7 = −69.221 | | | |
| | d7 = 1.100 | N4 = 1.84666 | ν4 = 23.82 |
| r8 = 4.381 | | | |
| | d8 = 0.550 | | |
| r9 = 8.663 | | | |
| | d9 = 1.100 | N5 = 1.68893 | ν5 = 31.16 |
| r10 = −6.568 | | | |
| | d10 = 0.360~0.360~0.360 | | |
| r11 = ∞ (Aperture Stop A) | | | |
| | d11 = 1.252~0.754~1.023 | | |
| r12* = −35.090 | | | |
| | d12 = 1.150 | N6 = 1.58340 | ν6 = 30.23 |
| r13* = −6.027 | | | |
| | d13 = 0.940 | | |
| r14 = −3.416 | | | |
| | d14 = 0.287 | N7 = 1.80500 | ν7 = 40.97 |
| r15 = 89.446 | | | |
| | d15 = 1.500~4.916~8.687 | | |
| r16 = ∞ | | | |
| | d16 = 1.800 | N8 = 1.51680 | ν8 = 64.20 |
| r17 = ∞ | | | |
| | d17 = 0.200 | | |
| r18 = ∞ | | | |
| | d18 = 1.800 | N9 = 1.64050 | ν9 = 60.08 |
| r19* = −7.362 | | | |
| | Σd = 23.862~23.862~23.862 | | |

[Aspherical Coefficients of 5th Surface (r5)]

$\epsilon = 1.0000$
$A4 = -0.12984 \times 10^{-2}$
$A6 = 0.71115 \times 10^{-4}$
$A8 = -0.82696 \times 10^{-4}$
$A10 = 0.14170 \times 10^{-4}$
$A12 = -0.13231 \times 10^{-5}$

[Aspherical Coefficients of 6th Surface (r6)]

$\epsilon = 1.0000$
$A4 = 0.22699 \times 10^{-2}$
$A6 = 0.95246 \times 10^{-5}$
$A8 = -0.49897 \times 10^{-4}$
$A10 = 0.88097 \times 10^{-5}$
$A12 = -0.92206 \times 10^{-6}$

[Aspherical Coefficients of 12th Surface (r12)]

$\epsilon = 1.0000$
$A4 = 0.10377 \times 10^{-2}$
$A6 = -0.20000 \times 10^{-3}$
$A8 = 0.61465 \times 10^{-4}$
$A10 = -0.68328 \times 10^{-5}$
$A12 = 0.39082 \times 10^{-6}$

[Aspherical Coefficients of 13th Surface (r13)]

$\epsilon = 1.0000$
$A4 = -0.44632 \times 10^{-3}$
$A6 = 0.64726 \times 10^{-5}$
$A8 = -0.14339 \times 10^{-5}$
$A10 = -0.14809 \times 10^{-6}$
$A12 = -0.10771 \times 10^{-4}$

[Aspherical Coefficients of 19th Surface (r19)]

$\epsilon = 1.0000$
$A4 = 0.53029 \times 10^{-5}$
$A6 = 0.48264 \times 10^{-9}$
$A8 = -0.24088 \times 10^{-9}$
$A10 = -0.16001 \times 10^{-12}$

TABLE 4

<<Construction Data of Example 4>>
f = 8.2~15.0~27.0
FNO = 4.12~6.10~8.24

| Radius of Curvature | Axial Distance | Refractive Index | Abbe Number |
|---|---|---|---|
| r1 = 61.286 | | | |
| | d1 = 0.500 | N1 = 1.85026 | ν1 = 32.15 |
| r2 = 5.674 | | | |
| | d2 = 0.700 | | |
| r3 = 5.772 | | | |
| | d3 = 1.450 | N2 = 1.833.50 | ν2 = 21.00 |
| r4 = 9.728 | | | |
| | d4 = 5.530~2.562~-0.690 | | |
| r5 = ∞ (Flare Cutter S) | | | |
| | d5 = 1.308 | | |
| r6* = 3.854 | | | |
| | d6 = 1.400 | N3 = 1.57885 | ν3 = 69.57 |
| r7* = 36.943 | | | |
| | d7 = 0.150 | | |
| r8 = -242.891 | | | |
| | d8 = 1.000 | N4 = 1.84666 | ν4 = 23.82 |
| r9 = 5.382 | | | |
| | d9 = 0.800 | | |
| r10 = 11.410 | | | |
| | d10 = 1.095 | N5 = 1.77551 | ν5 = 37.90 |
| r11 = -7.925 | | | |
| | d11 = 0.569 | | |
| r12 = ∞ (Aperture Stop A) | | | |
| | d12 = 3.409~0.800~0.318 | | |
| r13* = -17.062 | | | |
| | d13 = 1.000 | N6 = 1.58340 | ν6 = 30.23 |
| r14 = -6.331 | | | |
| | d14 = 1.000 | | |
| r15 = -3.656 | | | |
| | d15 = 0.400 | N7 = 1.78831 | ν7 = 47.32 |
| r16 = -11.396 | | | |
| | d16 = 0.200~8.477~17.510 | | |
| r17 = ∞ | | | |
| | d17 = 4.000 | N8 = 1.51680 | ν8 = 64.20 |
| r18 = ∞ | | | |
| | d18 = 0.200 | | |
| r19 = ∞ | | | |
| | d19 = 0.800 | N9 = 1.77250 | ν9 = 49.77 |
| r20 = -11.111 | | | |
| | Σd = 25.510~28.210~33.510 | | |

[Aspherical Coefficients of 6th Surface (r6)]

$\epsilon = 1.0000$
$A4 = -0.81615 \times 10^{-3}$
$A6 = 0.84500 \times 10^{-4}$
$A8 = -0.77756 \times 10^{-4}$
$A10 = 0.13292 \times 10^{-4}$
$A12 = -0.12185 \times 10^{-5}$

[Aspherical Coefficients of 7th Surface (r7)]

$\epsilon = 1.0000$
$A4 = 0.18470 \times 10^{-2}$
$A6 = -0.10277 \times 10^{-4}$
$A8 = -0.47766 \times 10^{-4}$
$A10 = 0.82440 \times 10^{-5}$
$A12 = -0.84956 \times 10^{-6}$

[Aspherical Coefficients of 13th Surface (r13)]

$\epsilon = 1.0000$
$A4 = 0.12339 \times 10^{-2}$
$A6 = -0.17143 \times 10^{-3}$
$A8 = 0.58540 \times 10^{-4}$
$A10 = -0.64512 \times 10^{-5}$
$A12 = 0.35323 \times 10^{-6}$

[Aspherical Coefficients of 20th Surface (r20)]

$\epsilon = 1.0000$
$A4 = 0.35835 \times 10^{-4}$
$A6 = 0.42444 \times 10^{-7}$
$A8 = 0.48649 \times 10^{-4}$
$A10 = 0.90623 \times 10^{-9}$
$A12 = 0.28186 \times 10^{-15}$ TABLE 4-continued <<Construction Data of Example 4>>
f = 8.2~15.0~27.0
FNO = 4.12~6.10~8.24

[Values of Condition (8) on 20th Surface (r20) (Gr4)]

$y = 0.3200 \ldots PW \cdot (N'-N) \cdot \{x(y) - x(0)\} = -0.2523 \times 10^{-6}$
$y = 0.6400 \ldots PW \cdot (N'-N) \cdot \{x(y) - x(0)\} = -0.2020 \times 10^{-5}$
$y = 0.9600 \ldots PW \cdot (N'-N) \cdot \{x(y) - x(0)\} = -0.6823 \times 10^{-5}$
$y = 1.2800 \ldots PW \cdot (N'-N) \cdot \{x(y) - x(0)\} = -0.1620 \times 10^{-4}$
$y = 1.6000 \ldots PW \cdot (N'-N) \cdot \{x(y) - x(0)\} = -0.3171 \times 10^{-4}$
$y = 1.9200 \ldots PW \cdot (N'-N) \cdot \{x(y) - x(0)\} = -0.5502 \times 10^{-4}$
$y = 2.2400 \ldots PW \cdot (N'-N) \cdot \{x(y) - x(0)\} = -0.8800 \times 10^{-4}$
$y = 2.5600 \ldots PW \cdot (N'-N) \cdot \{x(y) - x(0)\} = -0.1330 \times 10^{-3}$
$y = 2.8800 \ldots PW \cdot (N'-N) \cdot \{x(y) - x(0)\} = -0.1933 \times 10^{-3}$
$y = 3.2000 \ldots PW \cdot (N'-N) \cdot \{x(y) - x(0)\} = -0.2741 \times 10^{-3}$

TABLE 5

<<Construction Data of Example 5>>
f = 8.1~11.3~15.6
FNO = 3.62~4.68~5.84

| Radius of Curvature | Axial Distance | Refractive Index | Abbe Number |
|---|---|---|---|
| r1 = -276.988 | | | |
| | d1 = 0.800 | N1 = 1.80100 | ν1 = 46.54 |
| r2 = 8.261 | | | |
| | d2 = 1.100 | | |
| r3 = 8.148 | | | |
| | d3 = 2.000 | N2 = 1.83400 | ν2 = 37.05 |
| r4 = 13.054 | | | |
| | d4 = 6.600~4.449~1.913 | | |
| r5 = ∞ (Flare Cutter S) | | | |
| | d5 = 0.200 | | |
| r6 = 2.702 | | | |
| | d6 = 1.900 | N3 = 1.48749 | ν3 = 70.44 |
| r7 = -11.331 | | | |
| | d7 = 0.160 | | |
| r8* = -5.210 | | | |
| | d8 = 0.797 | N4 = 1.84666 | ν4 = 23.82 |
| r9* = -10.540 | | | |
| | d9 = 0.398 | | |
| r10 = ∞ (Aperture Stop A) | | | |
| | d10 = 2.492~1.411~0.999 | | |
| r11* = -6.671 | | | |
| | d11 = 0.640 | N5 = 1.58340 | ν5 = 30.23 |
| r12* = -6.805 | | | |
| | d12 = 1.500 | | |
| r13 = -2.938 | | | |
| | d13 = 0.300 | N6 = 1.51823 | ν6 = 58.96 |
| r14 = -7.065 | | | |
| | d14 = 0.200~3.432~6.379 | | |
| r15 = ∞ | | | |
| | d15 = 1.500 | N7 = 1.51680 | ν7 = 64.20 |
| r16 = ∞ | | | |
| | d16 = 0.200 | | |
| r17 = ∞ | | | |
| | d17 = 2.000 | N8 = 1.64050 | ν8 = 60.08 |
| r18* = -7.143 | | | |
| | Σd = 22.787~22.787~22.787 | | |

[Aspherical Coefficients of 8th Surface (r8)]

$\epsilon = 1.0000$
$A4 = 0.44482 \times 10^{-2}$
$A6 = 0.14294 \times 10^{-2}$
$A8 = -0.10774 \times 10^{-3}$
$A10 = -0.13632 \times 10^{-4}$

[Aspherical Coefficients of 9th Surface (r9)]

$\epsilon = 1.0000$
$A4 = 0.93351 \times 10^{-2}$

TABLE 5-continued

<<Construction Data of Example 5>>
f = 8.1~11.3~15.6
FNO = 3.62~4.68~5.84

| Radius of Curvature | Axial Distance | Refractive Index | Abbe Number |
|---|---|---|---|

A6 = 0.17133 × 10$^{-2}$
A8 = 0.17999 × 10$^{-3}$
A10 = 0.10903 × 10$^{-4}$
[Aspherical Coefficients of 11th Surface (r11)]

ε = 1.0000
A3 = 0.70260 × 10$^{-3}$
A4 = 0.11883 × 10$^{-2}$
A5 = 0.15588 × 10$^{-2}$
A6 = 0.44261 × 10$^{-4}$
A7 = −0.78636 × 10$^{-4}$
A8 = 0.14030 × 10$^{-3}$
A9 = −0.66205 × 10$^{-4}$
A10 = 0.11538 × 10$^{-4}$
A11 = 0.10503 × 10$^{-6}$
A12 = 0.12478 × 10$^{-5}$
[Aspherical Coefficients of 12th Surface (r12)]

ε = 1.0000
A4 = 0.25075 × 10$^{-2}$
A5 = 0.22412 × 10$^{-3}$
A6 = 0.14899 × 10$^{-3}$
A7 = 0.68380 × 10$^{-5}$
A8 = 0.24088 × 10$^{-4}$
A9 = −0.40559 × 10$^{-4}$
A10 = 0.21298 × 10$^{-4}$
A11 = −0.50301 × 10$^{-5}$
A12 = 0.15328 × 10$^{-9}$
[Aspherical Coefficients of 18th Surface (r18)]

ε = 1.0000
A4 = 0.19302 × 10$^{-5}$
A6 = −0.16768 × 10$^{-7}$
A8 = −0.96374 × 10$^{-10}$
A10 = −0.32959 × 10$^{-12}$
[Values of Condition (8) on 18th Surface (r18) (Gr4)]

y = 0.3500 ... PW · (N'—N) · {x(y) − x(0)} = −0.1898 × 10$^{-7}$
y = 0.7000 ... PW · (N'—N) · {x(y) − x(0)} = −0.1511 × 10$^{-6}$
y = 1.0500 ... PW · (N'—N) · {x(y) − x(0)} = −0.5059 × 10$^{-6}$
y = 1.4000 ... PW · (N'—N) · {x(y) − x(0)} = −0.1185 × 10$^{-5}$
y = 1.7500 ... PW · (N'—N) · {x(y) − x(0)} = −0.2279 × 10$^{-5}$
y = 2.1000 ... PW · (N'—N) · {x(y) − x(0)} = −0.3863 × 10$^{-5}$
y = 2.4500 ... PW · (N'—N) · {x(y) − x(0)} = −0.5987 × 10$^{-5}$
y = 2.8000 ... PW · (N'—N) · {x(y) − x(0)} = −0.8678 × 10$^{-5}$
y = 3.1500 ... PW · (N'—N) · {x(y) − x(0)} = −0.1193 × 10$^{-4}$
y = 3.5000 ... PW · (N'—N) · {x(y) − x(0)} = −0.1568 × 10$^{-4}$

TABLE 6

<<Construction Data of Example 6>>
f = 6.1~10.7~14.6
FNO = 2.87~2.87~2.87

| Radius of Curvature | Axial Distance | Refractive Index | Abbe Number |
|---|---|---|---|
| r1 = 74.634 | | | |
| | d1 = 1.150 | N1 = 1.58913 | ν1 = 61.11 |
| r2 = −43.128 | | | |
| | d2 = 0.043 | | |
| r3 = 19.757 | | | |
| | d3 = 0.384 | N2 = 1.71300 | ν2 = 53.94 |
| r4* = 6.804 | | | |
| | d4 = 1.898 | | |
| r5 = −46.090 | | | |
| | d5 = 0.600 | N3 = 1.70154 | ν3 = 41.15 |
| r6 = −30.433 | | | |
| | d6 = 0.426 | | |

TABLE 6-continued

<<Construction Data of Example 6>>
f = 6.1~10.7~14.6
FNO = 2.87~2.87~2.87

| Radius of Curvature | Axial Distance | Refractive Index | Abbe Number |
|---|---|---|---|
| r7 = −13.558 | | | |
| | d7 = 0.320 | N4 = 1.77250 | ν4 = 49.62 |
| r8 = 11.276 | | | |
| | d8 = 0.331 | | |
| r9 = 12.839 | | | |
| | d9 = 1.100 | N5 = 1.84666 | ν5 = 23.83 |
| r10 = 102.052 | | | |
| | d10 = 8.465~2.542~0.640 | | |
| r11 = ∞ (Flare Cutter S) | | | |
| | d11 = 0.107 | | |
| r12 = 17.415 | | | |
| | d12 = 0.256 | N6 = 1.84666 | ν6 = 23.82 |
| r13 = 8.744 | | | |
| | d13 = 2.000 | N7 = 1.67000 | ν7 = 57.07 |
| r14 = −21.322 | | | |
| | d14 = 0.032 | | |
| r15 = 11.405 | | | |
| | d15 = 0.256 | N8 = 1.84666 | ν8 = 23.82 |
| r16 = 7.416 | | | |
| | d16 = 1.500 | N9 = 1.69680 | ν9 = 56.47 |
| r17 = 34.819 | | | |
| | d17 = 0.032 | | |
| r18 = 9.180 | | | |
| | d18 = 1.200 | N10 = 1.69100 | ν10 = 54.75 |
| r19 = 29.626 | | | |
| | d19 = 0.426~2.082~3.219 | | |
| r20 = ∞ (Aperture Stop A) | | | |
| | d20 = 0.299 | | |
| r21 = −231.114 | | | |
| | d21 = 0.682 | N11 = 1.75520 | ν11 = 27.51 |
| r22 = −6.563 | | | |
| | d22 = 0.243 | N12 = 1.60311 | ν12 = 60.74 |
| r23 = 8.031 | | | |
| | d23 = 0.981 | | |
| r24 = −5.487 | | | |
| | d24 = 0.213 | N13 = 1.61800 | ν13 = 63.39 |
| r25* = −26.911 | | | |
| | d25 = 2.093~0.904~0.171 | | |
| r26 = 70.009 | | | |
| | d26 = 0.213 | N14 = 1.84666 | ν14 = 23.82 |
| r27 = 9.638 | | | |
| | d27 = 0.182 | | |
| r28 = 11.871 | | | |
| | d28 = 1.800 | N15 = 1.77250 | ν15 = 49.77 |
| r29* = −6.346 | | | |
| | d29 = 0.032 | | |
| r30 = 11.539 | | | |
| | d30 = 2.100 | N16 = 1.51742 | ν16 = 52.15 |
| r31 = −5.019 | | | |
| | d31 = 0.213 | N17 = 1.83400 | ν17 = 37.05 |
| r32 = 4946.087 | | | |
| | d32 = 1.500~3.329~4.914 | | |
| r33 = ∞ | | | |
| | d33 = 4.000 | N18 = 1.51680 | ν18 = 64.20 |
| r34 = ∞ | | | |
| | d34 = 1.000 | | |
| r35 = ∞ | | | |
| | d35 = 2.000 | N19 = 1.51680 | ν19 = 64.20 |
| r36 = −22.222 | | | |
| Σd = 38.046~34.419~34.507 | | | |

[Aspherical Coefficients of 4th Surface (r4)]

ε = 1.0000
A4 = −0.10011 × 10$^{-3}$
A6 = 0.31421 × 10$^{-5}$
A8 = −0.24188 × 10$^{-6}$
A10 = 0.10941 × 10$^{-7}$
A12 = −0.27866 × 10$^{-9}$
[Aspherical Coefficients of 25th Surface (r25)]

ε = 1.0000
A4 = 0.26215 × 10$^{-4}$

TABLE 6-continued

<<Construction Data of Example 6>>
f = 6.1~10.7~14.6
FNO = 2.87~2.87~2.87

| Radius of Curvature | Axial Distance | Refractive Index | Abbe Number |
|---|---|---|---|

A6 = 0.11503 × $10^{-4}$
A8 = 0.29046 × $10^{-5}$
A10 = −0.49935 × $10^{-6}$
A12 = 0.40222 × $10^{-7}$
[Aspherical Coefficients of 29th Surface (r29)]

$\epsilon$ = 1.0000
A4 = 0.11456 × $10^{-3}$
A6 = −0.71256 × $10^{-5}$
A8 = −0.35526 × $10^{-6}$
A10 = 0.91826 × $10^{-7}$
A12 = −0.91325 × $10^{-8}$

TABLE 7

<<Construction Data of Example 7>>
f = 6.1~10.7~14.6
FNO = 2.83~2.83~2.83

| Radius of Curvature | Axial Distance | Refractive Index | Abbe Number |
|---|---|---|---|
| r1 = −66.552 | | | |
| | d1 = 0.787 | N1 = 1.58913 | ν1 = 61.11 |
| r2 = 139.748 | | | |
| | d2 = 0.100 | | |
| r3 = 10.614 | | | |
| | d3 = 0.300 | N2 = 1.71300 | ν2 = 53.94 |
| r4* = 7.465 | | | |
| | d4 = 1.782 | | |
| r5 = −33.623 | | | |
| | d5 = 0.919 | N3 = 1.70154 | ν3 = 41.15 |
| r6 = −14.039 | | | |
| | d6 = 0.113 | | |
| r7 = −11.031 | | | |
| | d7 = 0.500 | N4 = 1.77250 | ν4 = 49.62 |
| r8 = 9.179 | | | |
| | d8 = 0.210 | | |
| *r9 = 10.361 | | | |
| | d9 = 0.700 | N5 = 1.84666 | ν5 = 23.83 |
| r10 = 48.117 | | | |
| | d10 = 7.987~1.982~0.102 | | |
| r11 = ∞ (Flare Cutter S) | | | |
| | d11 = 0.100 | | |
| r12 = 18.496 | | | |
| | d12 = 0.500 | N6 = 1.84666 | ν6 = 23.82 |
| r13 = 8.406 | | | |
| | d13 = 1.222 | N7 = 1.67000 | ν7 = 57.07 |
| r14 = −20.334 | | | |
| | d14 = 0.100 | | |
| r15 = 10.373 | | | |
| | d15 = 0.500 | N8 = 1.84666 | ν8 = 23.82 |
| r16 = 6.672 | | | |
| | d16 = 1.041 | N9 = 1.69680 | ν9 = 56.47 |
| r17 = 42.664 | | | |
| | d17 = 0.100 | | |
| r18 = 8.498 | | | |
| | d18 = 0.741 | N10 = 1.69100 | ν10 = 54.75 |
| r19 = 20.536 | | | |
| | d19 = 0.801~2.215~3.184 | | |
| r20 = ∞ (Aperture Stop A) | | | |
| | d20 = 0.700 | | |
| r21 = 65.843 | | | |
| | d21 = 0.760 | N11 = 1.75520 | ν11 = 27.51 |
| r22 = −6.562 | | | |
| | d22 = 0.629 | N12 = 1.60311 | ν12 = 60.74 |
| r23 = 6.958 | | | |
| | d23 = 0.680 | | |
| r24 = −7.402 | | | |
| | d24 = 0.300 | N13 = 1.61800 | ν13 = 63.39 |

TABLE 7-continued

<<Construction Data of Example 7>>
f = 6.1~10.7~14.6
FNO = 2.83~2.83~2.83

| Radius of Curvature | Axial Distance | Refractive Index | Abbe Number |
|---|---|---|---|
| r25* = −142.093 | | | |
| | d25 = 1.929~0.708~0.100 | | |
| r26 = 45.557 | | | |
| | d26 = 0.300 | N14 = 1.84666 | ν14 = 23.82 |
| r27 = 7.160 | | | |
| | d27 = 0.131 | | |
| r28 = 7.848 | | | |
| | d28 = 1.868 | N15 = 1.77250 | ν15 = 49.77 |
| r29* = −9.057 | | | |
| | d29 = 0.100 | | |
| r30 = 6.729 | | | |
| | d30 = 1.700 | N16 = 1.51742 | ν16 = 52.15 |
| r31 = −6.506 | | | |
| | d31 = 0.300 | N17 = 1.83400 | ν17 = 37.05 |
| r32 = 40.916 | | | |
| | d32 = 0.100~2.441~4.340 | | |
| r33 = | | | |
| | d33 = 4.000 | N18 = 1.51680 | ν18 = 64.20 |
| r34 = ∞ | | | |
| | d34 = 0.500 | | |
| r35 = ∞ | | | |
| | d35 = 2.000 | N19 = 1.51680 | ν19 = 64.20 |
| r36* = −23.000 | | | |

Σd = 34.500~31.029~31.409
[Aspherical Coefficients of 4th Surface (r4)]

$\epsilon$ = 1.0000
A4 = −0.18478 × $10^{-3}$
A6 = −0.25479 × $10^{-5}$
A8 = −0.30428 × $10^{-6}$
A10 = 0.17274 × $10^{-7}$
A12 = −0.67789 × $10^{-9}$
[Aspherical Coefficients of 25th Surface (r25)]

$\epsilon$ = 1.0000
A4 = −0.11317 × $10^{-3}$
A6 = 0.79756 × $10^{-5}$
A8 = 0.33989 × $10^{-5}$
A10 = −0.43611 × $10^{-6}$
A12 = 0.34170 × $10^{-7}$
[Aspherical Coefficients of 29th Surface (r29)]

$\epsilon$ = 1.0000
A4 = 0.17682 × $10^{-3}$
A6 = −0.94586 × $10^{-5}$
A8 = −0.65417 × $10^{-6}$
A10 = 0.22065 × $10^{-7}$
A12 = 0.13614 × $10^{-8}$
[Aspherical Coefflcjents of 36th Surface (r36)]

$\epsilon$ = 1.0000
A4 = 0.96016 × $10^{-2}$
A6 = −0.10340 × $10^{-2}$
A8 = 0.76919 × $10^{-5}$
A10 = 0.10775 × $10^{-5}$
A12 = 0.36429 × $10^{-7}$
[Values of Condition (16) on 36th Surface (r36) (Gr5)]

y = 0.3300 ... PW · (N'—N) · {x(y) − x(0)} = −0.1575 × $10^{-4}$
y = 0.6600 ... PW · (N'—N) · {x(y) − x(0)} = −0.1192 × $10^{-3}$
y = 0.9900 ... PW · (N'—N) · {x(y) − x(0)} = −0.3650 × $10^{-3}$
y = 1.3200 ... PW · (N'—N) · {x(y) − x(0)} = −0.7437 × $10^{-3}$
y = 1.6500 ... PW · (N'—N) · {x(y) − x(0)} = −0.1159 × $10^{-2}$
y = 1.9800 ... PW · (N'—N) · {x(y) − x(0)} = −0.1423 × $10^{-2}$
y = 2.3100 ... PW · (N'—N) · {x(y) − x(0)} = −0.1295 × $10^{-2}$
y = 2.6400 ... PW · (N'—N) · {x(y) − x(0)} = −0.6058 × $10^{-3}$
y = 2.9700 ... PW · (N'—N) · {x(y) − x(0)} = 0.4529 × $10^{-3}$
y = 3.3000 ... PW · (N'—N) · {x(y) − x(0)} = 0.7486 × $10^{-3}$

TABLE 8

<<Construction Data of Example 8>>
f = 5.1~8.8~14.5
FNO = 3.60~3.96~4.60

| Radius of Curvature | Axial Distance | Refractive Index | Abbe Number |
|---|---|---|---|
| r1 = 18.854 | | | |
| | d1 = 0.160 | N1 = 1.77250 | ν1 = 49.77 |
| r2* = 5.770 | | | |
| | d2 = 1.042 | | |
| r3 = 10.890 | | | |
| | d3 = 0.160 | N2 = 1.80741 | ν2 = 31.59 |
| r4 = 10.646 | | | |
| | d4 = 0.100 | | |
| r5 = 10.738 | | | |
| | d5 = 0.160 | N3 = 1.77250 | ν3 = 49.77 |
| r6 = 7.772 | | | |
| | d6 = 0.623 | | |
| r7 = 7.776 | | | |
| | d7 = 0.854 | N4 = 1.84666 | ν4 = 23.83 |
| r8 = 14.154 | | | |
| | d8 = 14.789~4.776~0.100 | | |
| r9 = 6.775 | | | |
| | d9 = 0.160 | N5 = 1.83400 | ν5 = 37.05 |
| *r10 = 3.433 | | | |
| | d10 = 1.228 | N6 = 1.69680 | ν6 = 56.47 |
| r11 = -9.445 | | | |
| | d11 = 0.160 | N7 = 1.75000 | ν7 = 25.14 |
| r12 = -68.305 | | | |
| | d12 = 0.100 | | |
| r13 = 4.158 | | | |
| | d13 = 1.880 | N8 = 1.61800 | ν8 = 63.39 |
| r14 = 4.709 | | | |
| | d14 = 0.124~0.689~1.510 | | |
| r15 = ∞ (Aperture Stop A) | | | |
| | d15 = 0.151 | | |
| r16 = -11.068 | | | |
| | d16 = 0.321 | N9 = 1.80518 | ν9 = 25.43 |
| r17 = -3.570 | | | |
| | d17 = 0.160 | N10 = 1.74950 | ν10 = 50.00 |
| r18 = 5.723 | | | |
| | d18 = 0.881~1.020~0.407 | | |
| r19 = 6.511 | | | |
| | d19 = 1.051 | N11 = 1.67100 | ν11 = 51.73 |
| r20 = -4.877 | | | |
| | d20 = 0.100 | | |
| r21 = 6.831 | | | |
| | d21 = 0.730 | N12 = 1.67000 | ν12 = 57.07 |
| r22 = 56.469 | | | |
| | d22 = 0.406 | | |
| r23 = -3.881 | | | |
| | d23 = 0.160 | N13 = 1.75520 | ν13 = 27.51 |
| r24 = 19.942 | | | |
| | d24 = 0.500~1.886~3.716 | | |
| r25 = ∞ | | | |
| | d25 = 4.000 | N14 = 1.51680 | ν14 = 64.20 |
| r26 = ∞ | | | |
| | d26 = 0.500 | | |
| r27 = ∞ | | | |
| | d27 = 2.000 | N15 = 1.51680 | ν15 = 64.20 |
| r28* = -4.000 | | | |
| | Σd = 32.500~24.575~21.939 | | |

[Aspherical Coefficients of 2nd Surface (r2)]

ε = 1.0000
A4 = -0.19255 × 10$^{-3}$
A6 = -0.12851 × 10$^{-4}$
A8 = 0.26328 × 10$^{-6}$
A10 = -0.60770 × 10$^{-8}$
A12 = -0.36334 × 10$^{-9}$

[Aspherical Coefficients of 28th Surface (r28)]

ε = 1.0000
A4 = 0.15312 × 10$^{-4}$
A6 = -0.14818 × 10$^{-2}$
A8 = 0.64907 × 10$^{-4}$

TABLE 8-continued

<<Construction Data of Example 8>>
f = 5.1~8.8~14.5
FNO = 3.60~3.96~4.60

| Radius of Curvature | Axial Distance | Refractive Index | Abbe Number |
|---|---|---|---|

[Values of Condition (16) on 28th Surface (r28) (Gr5)]

y = 0.3500 ... PW · (N'—N) · {x(y) - x(0)} = -0.1722 × 10$^{-3}$
y = 0.7000 ... PW · (N'—N) · {x(y) - x(0)} = -0.1306 × 10$^{-2}$
y = 1.0500 ... PW · (N'—N) · {x(y) - x(0)} = -0.4025 × 10$^{-2}$
y = 1.4000 ... PW · (N'—N) · {x(y) - x(0)} = -0.8395 × 10$^{-3}$
y = 1.7500 ... PW · (N'—N) · {x(y) - x(0)} = -0.1392 × 10$^{-2}$
y = 2.1000 ... PW · (N'—N) · {x(y) - x(0)} = -0.1987 × 10$^{-2}$
y = 2.4500 ... PW · (N'—N) · {x(y) - x(0)} = -0.2611 × 10$^{-2}$
y = 2.8000 ... PW · (N'—N) · {x(y) - x(0)} = -0.3439 × 10$^{-3}$
y = 3.1500 ... PW · (N'—N) · {x(y) - x(0)} = -0.5041 × 10$^{-3}$
y = 3.5000 ... PW · (N'—N) · {x(y) - x(0)} = -0.8662 × 10$^{-3}$

TABLE 9

<<Construction Data of Example 9>>
f = 5.1~8.8~14.5
FNO = 3.60~3.96~4.60

| Radius of Curvature | Axial Distance | Refractive Index | Abbe Number |
|---|---|---|---|
| r1 = 20.037 | | | |
| | d1 = 0.150 | N1 = 1.77250 | ν1 = 49.77 |
| r2* = 5.811 | | | |
| | d2 = 1.774 | | |
| r3 = 7.548 | | | |
| | d3 = 0.150 | N2 = 1.77250 | ν2 = 49.77 |
| r4 = 6.187 | | | |
| | d4 = 0.100 | | |
| r5 = 6.246 | | | |
| | d5 = 0.862 | N3 = 1.84666 | ν3 = 23.83 |
| r6 = 9.239 | | | |
| | d6 = 13.505~4.280~0.100 | | |
| r7 = 7.048 | | | |
| | d7 = 0.150 | N4 = 1.83400 | ν4 = 37.05 |
| r8 = 3.275 | | | |
| | d8 = 1.276 | N5 = 1.69680 | ν5 = 56.47 |
| r9 = -8.844 | | | |
| | d9 = 0.150 | N6 = 1.75000 | ν6 = 25.14 |
| r10 = -31.870 | | | |
| | d10 = 0.100 | | |
| r11 = 3.561 | | | |
| | d11 = 1.854 | N7 = 1.61800 | ν7 = 63.39 |
| r12 = 3.522 | | | |
| | d12 = 0.143~0.665~1.430 | | |
| r13 = ∞ (Aperture Stop A) | | | |
| | d13 = 0.202 | | |
| r14 = -7.505 | | | |
| | d14 = 0.315 | N8 = 1.80518 | ν8 = 25.43 |
| r15 = -2.963 | | | |
| | d15 = 0.450 | N9 = 1.74950 | ν9 = 50.00 |
| r16 = 6.113 | | | |
| | d16 = 0.809~0.706~0.100 | | |
| r17 = 6.466 | | | |
| | d17 = 0.703 | N10 = 1.67100 | ν10 = 51.73 |
| r18 = -4.099 | | | |
| | d18 = 0.100 | | |
| r19 = 6.630 | | | |
| | d19 = 0.478 | N11 = 1.67000 | ν11 = 57.07 |
| r20 = -321.288 | | | |
| | d20 = 0.379 | | |
| r21 = -3.609 | | | |
| | d21 = 0.150 | N12 = 1.75520 | ν12 = 27.51 |
| r22 = 23.645 | | | |
| | d22 = 0.500~1.886~3.716 | | |
| r23 = ∞ | | | |
| | d23 = 4.000 | N13 = 1.51680 | ν13 = 64.20 |

TABLE 9-continued

<<Construction Data of Example 9>>
f = 5.1~8.8~14.5
FNO = 3.60~3.96~4.60

| Radius of Curvature | Axial Distance | Refractive Index | Abbe Number |
|---|---|---|---|
| r24 = ∞ | | | |
| | d24 = 0.500 | | |
| r25 = ∞ | | | |
| | d25 = 2.000 | N14 = 1.51680 | ν14 = 64.20 |
| r2.6* = −4.000 | | | |
| | Σd =30.500~23.081~20.890 | | |

[Aspherical Coefficients of 2nd Surface (r2)]

$\epsilon = 1.0000$
$A4 = -0.11744 \times 10^{-3}$
$A6 = -0.11084 \times 10^{-4}$
$A8 = 0.13491 \times 10^{-6}$
$A10 = -0.12471 \times 10^{-8}$
$A12 = -0.36737 \times 10^{-9}$

[Aspherical Coefficients of 26th Surface (r26)]

$\epsilon = 1.0000$
$A4 = 0.13532 \times 10^{-1}$
$A6 = -0.11449 \times 10^{-2}$
$A8 = 0.49295 \times 10^{-4}$

[Values of Condition (16) on 26th Surface (r26) (Gr5)]

$y = 0.3500 \ldots PW \cdot (N'-N) \cdot \{x(y) - x(0)\} = -0.1526 \times 10^{-3}$
$y = 0.7000 \ldots PW \cdot (N'-N) \cdot \{x(y) - x(0)\} = -0.1165 \times 10^{-2}$
$y = 1.0500 \ldots PW \cdot (N'-N) \cdot \{x(y) - x(0)\} = -0.3636 \times 10^{-2}$
$y = 1.4000 \ldots PW \cdot (N'-N) \cdot \{x(y) - x(0)\} = -0.7728 \times 10^{-2}$
$y = 1.7500 \ldots PW \cdot (N'-N) \cdot \{x(y) - x(0)\} = -0.1317 \times 10^{-1}$
$y = 2.1000 \ldots PW \cdot (N'-N) \cdot \{x(y) - x(0)\} = -0.1948 \times 10^{-1}$
$y = 2.4500 \ldots PW \cdot (N'-N) \cdot \{x(y) - x(0)\} = -0.2662 \times 10^{-1}$
$y = 2.8000 \ldots PW \cdot (N'-N) \cdot \{x(y) - x(0)\} = -0.3593 \times 10^{-1}$
$y = 3.1500 \ldots PW \cdot (N'-N) \cdot \{x(y) - x(0)\} = -0.5175 \times 10^{-1}$
$y = 3.5000 \ldots PW \cdot (N'-N) \cdot \{x(y) - x(0)\} = -0.8348 \times 10^{-1}$

TABLE 10

<<Values Corresponding to Conditions (1) to (7)>>

| | Cond. | Emb. 1 | Emb. 2 | Emb. 3 | Emb. 4 | Emb. 5 |
|---|---|---|---|---|---|---|
| (1) | $\phi 1/\phi C$ | −1.16562 | −0.63433 | −0.75199 | −1.00437 | −0.62754 |
| (2) | $\phi 2/\phi C$ | 1.99199 | 1.77032 | 1.77038 | 1.93890 | 1.67090 |
| (3) | $\phi 3/\phi C$ | −1.47592 | −1.27888 | −1.69844 | −1.13079 | −1.14339 |
| (4) | LBW/Y'max (Y'max = 3.0000) | 0.7323 | 1.0373 | 1.6978 | 1.2184 | 1.0171 |
| (5) | bw/aw | 1.7387 | 2.5495 | 1.9191 | 2.2602 | 2.7825 |
| (6) | $\phi 2/\phi T$ | 3.73932 | 2.38185 | 3.21754 | 3.63966 | 2.33135 |
| (7) | $\phi 3/\phi T$ | −2.77055 | −1.72065 | −3.08679 | −2.12269 | −1.59534 |

TABLE 11

<<Values Corresponding to Conditions (9) to (15)>>

| | Cond. | Emb 6 | Emb. 7 | Emb. 8 | Emb. 9 |
|---|---|---|---|---|---|
| (9) | $\phi 1/\phi C$ | −4.67825 | −4.71247 | −0.51600 | −0.51600 |
| (10) | $\phi 2/\phi C$ | 6.02336 | 6.39278 | 1.07205 | 2.06556 |
| (11) | $\phi 3/\phi C$ | −6.40340 | −5.82258 | −1.47287 | −1.65620 |
| (12) | $\phi 4/\phi C$ | 4.72886 | 4.76885 | 1.25944 | 1.46488 |
| (13) | LBW/Y'max (Y'max = 3.0000) | 1.6060 | 1.6871 | 1.8301 | 1.8301 |
| (14) | bw/aw | 1.4986 | 0.9259 | 2.5988 | 2.0913 |
| (15) | $\phi 2/\phi W$ | 0.85729 | 0.87908 | 0.70223 | 0.71976 |

What is claimed is:

1. A zoom lens system comprising:
   a first lens unit having a negative optical power;
   a second lens unit having a positive optical power;
   a third lens unit having a negative optical power; and
   a condenser lens unit having a positive optical power,
   wherein the first, second, and third lens units constitute a main optical system,
   wherein a zooming operation is performed by varying distances between the first lens unit, the second lens unit, the third lens unit, and the condenser lens unit,
   wherein the following condition is fulfilled:

$-1.5 < \phi 1/\phi C < -0.4$ where
   $\phi 1$ represents an optical power of the first lens unit; and
   $\phi C$ represents an optical power of the condenser lens unit.

2. A zoom lens system as claimed in claim 1, wherein the condenser lens unit is a single lens element.

3. A zoom lens system as claimed in claim 1, wherein the condenser lens unit is fixed during the zooming operation.

4. A zoom lens system as claimed in claim 1, wherein the following condition is fulfilled:

$1.4 < \phi 2/\phi C < 2.5$ where
   $\phi 2$ represents an optical power of the second lens unit; and
   $\phi C$ represents an optical power of the condenser lens unit.

5. A zoom lens system as claimed in claim 1, wherein the following condition is fulfilled:

$-2.0 < \phi 3/C < -0.7$ where
   $\phi 3$ represents an optical power of the third lens unit; and
   $\phi C$ represents an optical power of the condenser lens unit.

6. A zoom lens system as claimed in claim 1, wherein the following condition is fulfilled:

$0.5 < LBW/Y'max < 2.0$ where
   LBW represents a back focal length of the main optical system in the shortest focal length condition; and
   Y' max represents a maximum image height.

7. A zoom lens system as claimed in claim 1, wherein the following condition is fulfilled:

$1.2 < bw/aw < 3.0$ where
- aw represents a distance between an exit pupil and an image plane of the main optical system; and
- bw represents a distance between an exit pupil and an image plane of the entire zoom lens system.

8. A zoom lens system as claimed in claim 1, wherein the following condition is fulfilled:

$$1.5 < \phi 2/\phi T < 4.5$$

where
- $\phi 2$ represents an optical power of the second lens unit; and
- $\phi T$ represents an optical power of the entire zoom lens system in the longest focal length condition.

9. A zoom lens system as claimed in claim 1, wherein the following condition is fulfilled:

$$-4.0 < \phi 3/\phi T < -2.0$$

where
- $\phi 3$ represents an optical power of the third lens unit; and
- $\phi T$ represents an optical power of the entire zoom lens system in the longest focal length condition.

10. An optical system comprising:
- a zoom lens system for forming an image of an object on a solid-state imaging device, said zoom lens system comprising a first lens unit having a negative optical power, a second lens unit having a positive optical power, a third lens unit having a negative optical power, and a condenser lens unit having a positive optical power, and filters provided between the third lens unit and the solid-state imaging device and including an optical low-pass filter,
- wherein the first, second, and third lens units constitute a main optical system,
- wherein a zooming operation is performed by varying distances between the first lens unit, the second lens unit, the third lens unit, and the condenser lens unit,
- wherein the following condition is fulfilled:

$$-1.5 < \phi 1/\phi C < -0.4$$

where
- $\phi 1$ represents an optical power of the first lens unit; and
- $\phi C$ represents an optical power of the condenser lens unit.

11. An optical system as claimed in claim 10, wherein the condenser lens unit is a single lens element.

12. An optical system as claimed in claim 10, wherein the condenser lens unit is fixed during the zooming operation.

13. An optical system as claimed in claim 10, wherein the following condition is fulfilled:

$$1.4 < \phi 2/\phi C < 2.5$$

where
- $\phi 2$ represents an optical power of the second lens unit; and
- $\phi C$ represents an optical power of the condenser lens unit.

14. An optical system as claimed in claim 10, wherein the following condition is fulfilled:

$$-2.0 < \phi 3/\phi C < -0.7$$

where
- $\phi 3$ represents an optical power of the third lens unit; and
- $\phi C$ represents an optical power of the condenser lens unit.

15. An optical system as claimed in claim 10, wherein the following condition is fulfilled:

$$0.5 < LBW/Y'\text{max} < 2.0$$

where
- LBW represents a back focal length of the main optical system in the shortest focal length condition; and
- Y' max represents a maximum image height.

16. An optical system as claimed in claim 10, wherein the following condition is fulfilled:

$$1.2 < bw/aw < 3.0$$

where
- aw represents a distance between an exit pupil and an image plane of the main optical system; and
- bw represents a distance between an exit pupil and an image plane of the entire zoom lens system.

17. An optical system as claimed in claim 10, wherein the following condition is fulfilled:

$$1.5 < \phi 2/\phi T < 4.5$$

where
- $\phi 2$ represents an optical power of the second lens unit; and
- $\phi T$ represents an optical power of the entire zoom lens system in the longest focal length condition.

18. An optical system as claimed in claim 10, wherein the following condition is fulfilled:

$$-4.0 < \phi 3/\phi T < -2.0$$

where
- $\phi 3$ represents an optical power of the third lens unit; and
- $\phi T$ represents an optical power of the entire zoom lens system in the longest focal length condition.

19. An optical system comprising:
- a solid-state imaging device;
- a zoom lens system for forming an image of an object on the solid-state imaging device, said zoom lens system comprising:
  - a first lens unit having a negative optical power;
  - a second lens unit having a positive optical power; and
  - a third lens unit having a negative optical power;
  - a condenser lens unit having a positive optical power; and
  - filters provided between the third lens unit and the solid-state imaging device and including an optical low-pass filter,
- wherein the first, second, and third lens units constitute a main optical system,
- wherein a zooming operation is performed by varying distances between the first lens unit, the second lens unit, the third lens unit, and the condenser lens unit,
- wherein the following condition is fulfilled:

$$-1.5 < \phi 1/\phi C < -0.4$$

where
- $\phi 1$ represents an optical power of the first lens unit; and
- $\phi C$ represents an optical power of the condenser lens unit.

* * * * *

UNITED STATES PATENT AND TRADEMARK OFFICE
CERTIFICATE OF CORRECTION

PATENT NO : 5,963,377
DATED : October 5, 1999
INVENTOR(S): Takashi OKADA et al.

It is certified that error appears in the above-identified patent and that said Letters Patent are hereby corrected as shown below:

Column 31, line 32, delete "filters" and insert
   --at least one filter--.

Column 31, line 33, delete "device and" and insert
   --device, said at least one filter--.

Column 32, line 48, delete "filters" and insert
   --at least one filter--.

Column 32, line 49, delete "and including" and insert
   --, said at least one filter including--.

Signed and Sealed this

Fifteenth Day of May, 2001

Attest:

NICHOLAS P. GODICI

*Attesting Officer*       *Acting Director of the United States Patent and Trademark Office*